(12) United States Patent
Mushtaq

(10) Patent No.: US 11,265,334 B1
(45) Date of Patent: *Mar. 1, 2022

(54) METHODS AND SYSTEMS FOR DETECTING MALICIOUS SERVERS

(71) Applicant: SlashNext, Inc., Pleasanton, CA (US)

(72) Inventor: Atif Mushtaq, San Ramon, CA (US)

(73) Assignee: SLASHNEXT, INC., Pleasanton, CA (US)

(*) Notice: Subject to any disclaimer, the term of this patent is extended or adjusted under 35 U.S.C. 154(b) by 124 days.

This patent is subject to a terminal disclaimer.

(21) Appl. No.: 16/877,194

(22) Filed: May 18, 2020

Related U.S. Application Data

(63) Continuation of application No. 15/662,993, filed on Jul. 28, 2017, now Pat. No. 10,701,086.

(Continued)

(51) Int. Cl.
| | |
|---|---|
| *G06F 21/60* | (2013.01) |
| *H04L 29/06* | (2006.01) |
| *H04L 43/08* | (2022.01) |
| *H04L 67/141* | (2022.01) |
| *H04L 67/146* | (2022.01) |
| *G06K 9/62* | (2022.01) |

(Continued)

(52) U.S. Cl.
CPC ........ *H04L 63/1408* (2013.01); *G06K 9/6267* (2013.01); *G06N 20/00* (2019.01); *H04L 43/08* (2013.01); *H04L 47/2483* (2013.01); *H04L 67/141* (2013.01); *H04L 67/146* (2013.01); *H04L 67/36* (2013.01); *H04L 41/22* (2013.01)

(58) Field of Classification Search
CPC ......... H04L 63/14; H04L 67/36; H04L 47/24; G06N 20/00; G06K 9/62
See application file for complete search history.

(56) References Cited

U.S. PATENT DOCUMENTS

| | | |
|---|---|---|
| 7,054,930 B1 | 5/2006 | Cheriton |
| 8,402,543 B1 | 3/2013 | Ranjan et al. |

(Continued)

FOREIGN PATENT DOCUMENTS

WO WO-2011028176 A1 3/2011

OTHER PUBLICATIONS

Bilge, et al. EXPOSURE: Finding Malicious Domains Using Passive DNS Analysis, Ndss, 2011.

(Continued)

*Primary Examiner* — Wasika Nipa
(74) *Attorney, Agent, or Firm* — Wilson Sonsini Goodrich and Rosati

(57) ABSTRACT

An Active Intelligence method and system are provided for detecting malicious servers using an automated machine-learning active intelligence manager. The Active Intelligence method and system automatically and covertly extract forensic data and intelligence related to a selected server in real time to determine whether the server is part of a cybercrime infrastructure. An automated machine-learning active intelligence manager is provided that collects or gathers one or more types of forensic intelligence related to the operation of the server under investigation. The active intelligence manager combines the collected one or more (Continued)

types of forensic intelligence, extracts features from the combined forensic intelligence, and classifies the server as malicious or benign based on the extracted features.

14 Claims, 13 Drawing Sheets

Related U.S. Application Data

(60) Provisional application No. 62/367,972, filed on Jul. 28, 2016.

(51) Int. Cl.
*H04L 67/75* (2022.01)
*G06N 20/00* (2019.01)
*H04L 47/2483* (2022.01)
*H04L 41/22* (2022.01)

(56) References Cited

U.S. PATENT DOCUMENTS

| | | |
|---|---|---|
| 9,165,142 B1 | 10/2015 | Sanders et al. |
| 9,672,355 B2 | 6/2017 | Titonis et al. |
| 10,565,376 B1 | 2/2020 | Jung |
| 10,701,086 B1 | 6/2020 | Mushtaq |
| 10,764,313 B1 | 9/2020 | Mushtaq |
| 2006/0130144 A1 | 6/2006 | Wernicke |
| 2008/0141376 A1 | 6/2008 | Clausen et al. |
| 2009/0047937 A1 | 2/2009 | Zellner et al. |
| 2013/0054619 A1 | 2/2013 | Liu |
| 2014/0298460 A1 | 10/2014 | Xue et al. |
| 2016/0149943 A1* | 5/2016 | Kaloroumakis .... H04L 63/1425 726/23 |
| 2017/0244713 A1* | 8/2017 | Sun ..................... H04L 63/0281 |
| 2017/0346853 A1* | 11/2017 | Wyatt .................. H04L 9/3265 |
| 2020/0104498 A1 | 4/2020 | Smith et al. |

OTHER PUBLICATIONS

Burnap, et al. Real-time classification of malicious URLs on Twitter using machine activity data, Advances in Social Networks Analysis and Mining (ASONAM), 2015 IEEE/ACM International Conference on. IEEE, 2015.

Co-pending U.S. Appl. No. 16/937,229, inventor Mushtaq; Atif, filed on Jul. 23, 2020.

Seifert, et al. Identification of malicious web pages through analysis of underlying DNS and web server relationships, LCN, 2008.

Le, et al. Two-stage classification model to detect malicious web pages, Advanced Information Networking and Applications (AINA), IEEE, 2011, 8 pages.

Ma, et al. Beyond blacklists: learning to detect malicious web sites from suspicious URLs, Proceedings of the 15th ACM SIGKDD international conference on Knowledge discovery and data mining, ACM, 2009.

Ma, et al. Learning to detect malicious Uris, ACM Transactions on Intelligent Systems and Technology Article 30, Apr. 2011, 24 pages.

Shabtai et al. Detection of malicious code by applying machine learning classifiers on static features: a state-of-the-art survey. Information Security Technical Report, vol. 14, pp. 16-29 (2009).

U.S. Appl. No. 15/662,993 Notice of Allowance dated Apr. 8, 2020.

U.S. Appl. No. 15/662,993 Notice of Allowance dated May 20, 2020.

U.S. Appl. No. 15/878,792 Notice of Allowance dated May 20, 2020.

U.S. Appl. No. 15/662,993 Office Action dated Oct. 31, 2019.

U.S. Appl. No. 15/878,792 Office Action dated Oct. 30, 2019.

U.S. Appl. No. 15/662,993 Office Action dated May 14, 2019.

Xu, et al. Autoprobe: Towards automatic active malicious server probing using dynamic binary analysis, Proceedings of the 2014 ACM SIGSAC Conference on Computer and Communications Security, ACM, 2014.

* cited by examiner

METHODS AND SYSTEMS FOR DETECTING MALICIOUS SERVERS

CROSS-REFERENCE

This application is a continuation application of U.S. application Ser. No. 15/662,993, filed on Jul. 28, 2017, which claims priority to U.S. Provisional Application No. 62/367,972, filed Jul. 28, 2016, all of which are incorporated herein by reference in their entirety.

BACKGROUND OF THE INVENTION

Malicious servers are online hosts that are set up and controlled by cyber criminals to perform a variety of malicious activities. Some of these servers are set up to serve malware binaries, exploits, phishing, and/or credential stealing attacks. Some of these servers act as mother-ships that malware can use to retrieve commands after successfully compromising a machine.

One challenge in detecting malicious servers lies in gathering intelligence from these servers without alerting cyber criminals who are actively engaged in monitoring server connections to evade detection. Most of the malicious hosts log and monitor all connections to their servers and can block or reset a connection the moment they realize that someone is trying to investigate or is spying on them.

Another challenge lies not just in gathering but also in utilizing the different forensic intelligence available from online servers to accurately and automatically detect whether a given server is malicious or benign.

SUMMARY OF THE INVENTION

According to one or more embodiments, an Active Intelligence method and system is provided for automatically and covertly extracting forensic data and intelligence in real time to determine whether a selected server is part of a cybercrime infrastructure.

Methods and systems are provided that can automatically and covertly spy on an online server to extract forensic data and intelligence gathered in real time and utilize such data to determine whether the server is part of a cybercrime infrastructure. Such methods and systems may be advantageous to enable the gathering of real-time intelligence in a manner that does not alert a cybercriminal or malicious host that someone is trying to spy on them.

In a first aspect, disclosed herein is a method for detecting an online malicious server using a machine-learning active intelligence manager, the method comprising: monitoring and capturing network traffic between one or more clients and one or more Internet servers, the network traffic comprising one or more Internet communications between at least one client and at least one server; selecting an Internet communication between a client and a server; extracting a network flow from the Internet communication, wherein the network flow consists of one or more variables related to the Internet communication between the client and the server; and constructing a session identity structure from the network flow. In some embodiments, an automated machine-learning active intelligence manager is provided that receives the session identity structure. In some embodiments, the active intelligence manager independently performs several steps. In particular, in some embodiments, the active intelligence manager processes the session identity structure and collects or gathers one or more types of forensic intelligence related to the operation of the server based on the processed session identity structure. In some embodiments, the active intelligence manager combines the collected one or more types of forensic intelligence, extracts features from the combined forensic intelligence, and classifies the server as malicious or benign based on the extracted features.

In another aspect, disclosed herein is a computer-implemented system comprising: a digital processing device comprising: at least one processor, an operating system configured to perform executable instructions, a memory, and a computer program including instructions executable by the digital processing device to create an application for detecting an online malicious server using a machine-learning active intelligence manager, the application comprising: (a) a software module monitoring and capturing network traffic between one or more clients and one or more Internet servers, the network traffic comprising one or more Internet communications between at least one client and at least one server; (b) a software module selecting an Internet communication between a client and a server; (c) a software module extracting a network flow from the Internet communication, wherein the network flow consists of one or more variables related to the Internet communication between the client and the server; (d) a software module constructing a session identity structure from the network flow; and (e) a software module comprising an automated machine-learning active intelligence manager that receives the session identity structure and classifies the server as malicious or benign based on the session identity structure.

In some embodiments, the active intelligence manager independently performs the steps of: (i) processing the session identity structure; (ii) collecting one or more types of forensic intelligence related to the operation of the server based on the processed session identity structure; (iii) combining the collected one or more types of forensic intelligence; (iv) extracting features from the combined forensic intelligence; and (v) classifying the server as malicious or benign based on the extracted features. In some embodiments, the application further comprises a software module comprising a graphical interface for displaying information regarding the server, the information comprising information corresponding to one or more of the software modules in (a), (b), (c), (d), or (e). In some embodiments, the session identity structure comprises (a) one or more characteristics of the server selected from the group consisting of: protocol, IP, domain, and port, or (b) data comprising one or more variables of the network flow. In some embodiments, the one or more types of forensic intelligence comprise one or more members selected from the group consisting of: evasion based intelligence, geo location based intelligence, content based intelligence, and hosting infrastructure based intelligence. In some embodiments, the one or more types of forensic intelligence comprise two or more members selected from the group consisting of: evasion based intelligence, geo location based intelligence, content based intelligence, and hosting infrastructure based intelligence. In some embodiments, the extracted features comprise one or more members selected from the group consisting of: binary features, nominal features, and numeric features.

In another aspect, disclosed herein is a computer-implemented method for detecting an online malicious server using a machine-learning active intelligence manager, comprising: (a) monitoring and capturing, by a computer, network traffic between one or more clients and one or more Internet servers, the network traffic comprising one or more Internet communications between at least one client and at least one server; (b) selecting, by the computer, an Internet communication between a client and a server; (c) extracting, by the computer, a network flow from the Internet communication, wherein the network flow consists of one or more variables related to the Internet communication between the client and the server; (d) constructing, by the computer, a session identity structure from the network flow; and (e) providing an automated machine-learning active intelligence manager that receives, by the computer, the session identity structure, and classifies, by the computer, the server as malicious or benign based on the session identity structure.

In some embodiments, the active intelligence manager independently performs the steps of: (i) processing the session identity structure; (ii) collecting one or more types of forensic intelligence related to the operation of the server based on the processed session identity structure; (iii) combining the collected one or more types of forensic intelligence; (iv) extracting features from the combined forensic intelligence; and (v) classifying the server as malicious or benign based on the extracted features. In some embodiments, the method further comprises displaying, using a graphical interface, information regarding the server, the information corresponding to one or more of (a), (b), (c), (d), and (e). In some embodiments, the session identity structure comprises (a) one or more characteristics of the server selected from the group consisting of: protocol, IP, domain, and port, or (b) data comprising one or more variables of the network flow. In some embodiments, the one or more types of forensic intelligence comprise one or more members selected from the group consisting of: evasion based intelligence, geo location based intelligence, content based intelligence, and hosting infrastructure based intelligence. In some embodiments, the one or more types of forensic intelligence comprise two or more members selected from the group consisting of: evasion based intelligence, geo location based intelligence, content based intelligence, and hosting infrastructure based intelligence. In some embodiments, the extracted features comprise one or more members selected from the group consisting of: binary features, nominal features, and numeric features.

In another aspect, disclosed herein is a computer-implemented method for detecting an online malicious server, comprising: (a) monitoring and capturing, by a computer, network traffic between one or more clients and one or more Internet servers, the network traffic comprising one or more Internet communications between at least one client and at least one server, wherein the monitoring and capturing are performed covertly with respect to the server; (b) selecting, by the computer, an Internet communication between a client and a server; (c) extracting, by the computer, a network flow from the Internet communication, wherein the network flow consists of one or more variables related to the Internet communication between the client and the server; (d) constructing, by the computer, a session identity structure from the network flow; and (e) classifying, by the computer, the server as malicious or benign based on the session identity structure.

In some embodiments, the method further comprises (i) processing the session identity structure; (ii) collecting one or more types of forensic intelligence related to the operation of the server based on the processed session identity structure; (iii) combining the collected one or more types of forensic intelligence; (iv) extracting features from the combined forensic intelligence; and (v) classifying the server as malicious or benign based on the extracted features. The method of claim 15, further comprising displaying, using a graphical interface, information regarding the server, the information corresponding to one or more of (a), (b), (c), (d), and (e). In some embodiments, the session identity structure comprises (a) one or more characteristics of the server selected from the group consisting of: protocol, IP, domain, and port, or (b) data comprising one or more variables of the network flow. In some embodiments, the one or more types of forensic intelligence comprise one or more members selected from the group consisting of: evasion based intelligence, geo location based intelligence, content based intelligence, and hosting infrastructure based intelligence. In some embodiments, the extracted features comprise one or more members selected from the group consisting of: binary features, nominal features, and numeric features.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

FIG. 10 is a screen capture of an Event Notification and Malware Detail page viewed via a user interface of an exemplary embodiment.

FIG. 11 is a screen capture of an Event Notification and Hacker Group Detail page viewed via a user interface of an exemplary embodiment.

DETAILED DESCRIPTION

Figure 1A:
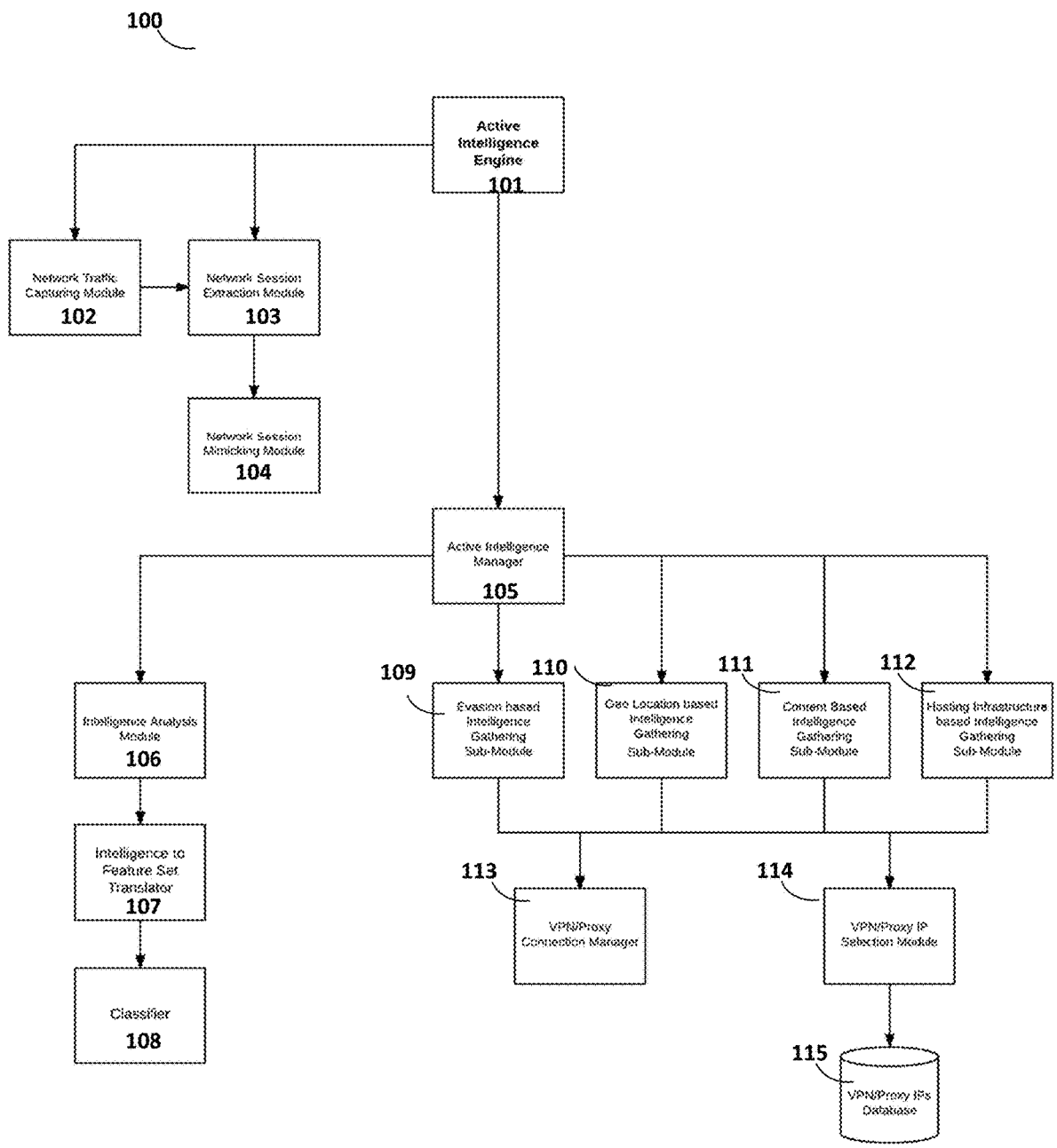
FIGS. 1A-1B show a number of functional components of an embodiment of an Active Intelligence System.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Specific embodiments of the disclosed method and system will now be described with reference to the drawings. Nothing in this detailed description is intended to imply that any particular step, component, or feature is essential to the invention.

An Active Intelligence method and system is provided for detecting malicious servers using an automated machine-learning active intelligence manager. In particular, the system can collect forensic intelligence from an online server and can use that intelligence to determine whether the online server is malicious or benign. The system can monitor Internet bound traffic in a network and can select a particular communication for further investigation. A network flow comprising a number of variables related to the server can be extracted from the selected communication. For example, the network flow can include variables related to the identity of the online server such as its Internet Protocol (IP) address, domain, and/or Port. The network flow can then be processed and used by the system to create new out-of-band connections to the selected online server. The system can use these out-of-band connections to probe an online server independently from a different network in order to collect or gather a variety of forensic data or intelligence.

Forensic intelligence gathered from online servers can fall into one of four different categories. In particular, forensics intelligence can be based on identifying one or more of: (1) whether an online server is trying to perform evasion techniques (i.e., evasion based intelligence); (2) whether an online server changes its behavior across different geo locations (i.e., geo location based intelligence); (3) an online server's hosted contents (i.e., content based intelligence); and (4) an online server's hosting infrastructure (i.e., hosting infrastructure based intelligence). Forensic intelligence data from the four categories can be used individually or collectively to determine whether or not an online server is a cyber crime infrastructure.

Evasion Based Intelligence

This type of intelligence generally relates to whether an online server is trying to perform different types of evasion techniques to avoid detection. Hackers are well aware that security researchers and law enforcement can connect to their servers in order to gather different types of intelligence to determine whether malicious activities are being conducted. Such hackers can employ a variety of evasion techniques in order to evade detection from law enforcement and other investigators and to thwart attempts at spying on their malicious activities. Examples of evasion techniques include: resetting network connections, permanently blocking the connecting IP addresses, redirecting connections to legitimate web sites, and switching to providing legitimate instead of malicious content.

Geo Location Based Intelligence

This type of intelligence generally relates to the behavior of or content provided by online servers across different geo (e.g., geographic) locations. Malicious servers may be known to change their behavior across different geo locations. For example, in the case of a targeted cyber-attack toward a company located in United States, hackers may only serve malicious content to an IP located within the U.S. However, if the same server is accessed through another geo location, such as for example, Britain, the hackers may assume that the access is not by the original victim but by someone else like law enforcement or other investigators who may be trying to spy on them. In addition, many hacking groups set up their servers in such way so as not to infect any victim who is living in their own county or region. Such a defensive strategy may be employed to make sure that the malicious server does not come under the scrutiny of local law enforcement agencies.

Content Based Intelligence

This type of Intelligence generally relates to the hosted content of a server. For example, an online server can host a variety of malicious content represented in a variety of file formats, such as HyperText Markup Language (HTML) code, images, java script, and binaries. Examples of malicious content include malware (e.g., malware binaries, malware java script, malware images, and/or malware macros), exploits, phishing, and/or credential stealing attacks. Such malicious content (e.g., malicious web sites) may be implemented partially or fully by, or supported by, for example, HTML code, images, java script, and/or binaries. Such malicious content may enable or instruct malicious servers to act as mother-ships that malware can use to retrieve commands after successfully compromising a machine. As another example, malicious content may comprise logs that malicious hosts (e.g., servers) have collected during the course of monitoring all connections to their servers and/or blocking or resetting a connection the moment they realize that someone is trying to investigate or is spying on them.

Hosting Infrastructure

This type of intelligence generally relates to the hosting infrastructure of a server. For example, in contrast to benign online servers, malicious servers are typically set up quickly in a short period of time to be used for a very limited time. As such, malicious servers are usually hosted on cheap hosting infrastructure with poor security posture. Once these malicious servers appear on security vendor black lists, hackers may abandon these servers and move to a new hosting infrastructure. In addition, malicious servers can be overloaded by connection attempts originated by thousands of infected machines, causing the servers to respond very slowly. Thus, information related to open ports can be used to finger print different software components installed on an online server. Some examples of intelligence extracted from hosting infrastructure include: the number of opened ports on an online server; the type of software installed on an online server like web server type; the protocols used by an online server such as Hypertext Transfer Protocol (http), Hypertext Transfer Protocol Secure (https), Internet relay chat (irc), file transfer protocol (ftp), and secure shell (ssh); and the online server response time.

Many malicious hosts log and monitor all connections to their servers, and can block or reset a connection once they realize that someone is trying to investigate or spy on them.

Thus, in order to hide its identity from a potential malicious server, a system provided herein can use a process of connecting to the selected remote server covertly in order to collect a variety of forensics intelligence about that server. Such forensics intelligence may then be analyzed to classify a server as benign or malicious. In this application, such a process may be referred to as Active Probing.

Active Probing can use anonymous servers (e.g., virtual private network (VPN) or Proxy servers) to establish the out-of-band connections it requires in order to covertly collect various types of forensic intelligence related to the selected server. Using anonymous VPN/Proxy servers to connect to potential malicious servers makes it difficult for the malicious server to trace and to block the Active Probing process. Depending on the type of forensic data or intelligence, the system can also initiate multiple connections to a server through one or more VPN/Proxy gateways. The system can also be configured to mimic or pose as a normal client by configuring its requests to appear similar to the original captured requests. This can enable the system to look like a normal client from the perspective of the selected online server.

Active Intelligence is the forensic data or intelligence collected by conducting Active Probing on an online server. This intelligence can be further used to determine the maliciousness of that server. In particular, once the Active Intelligence is gathered, the system can process the intelligence using a machine-learning based classification engine to determine whether the selected online server is part of a cybercriminal infrastructure.

Figure 1B:
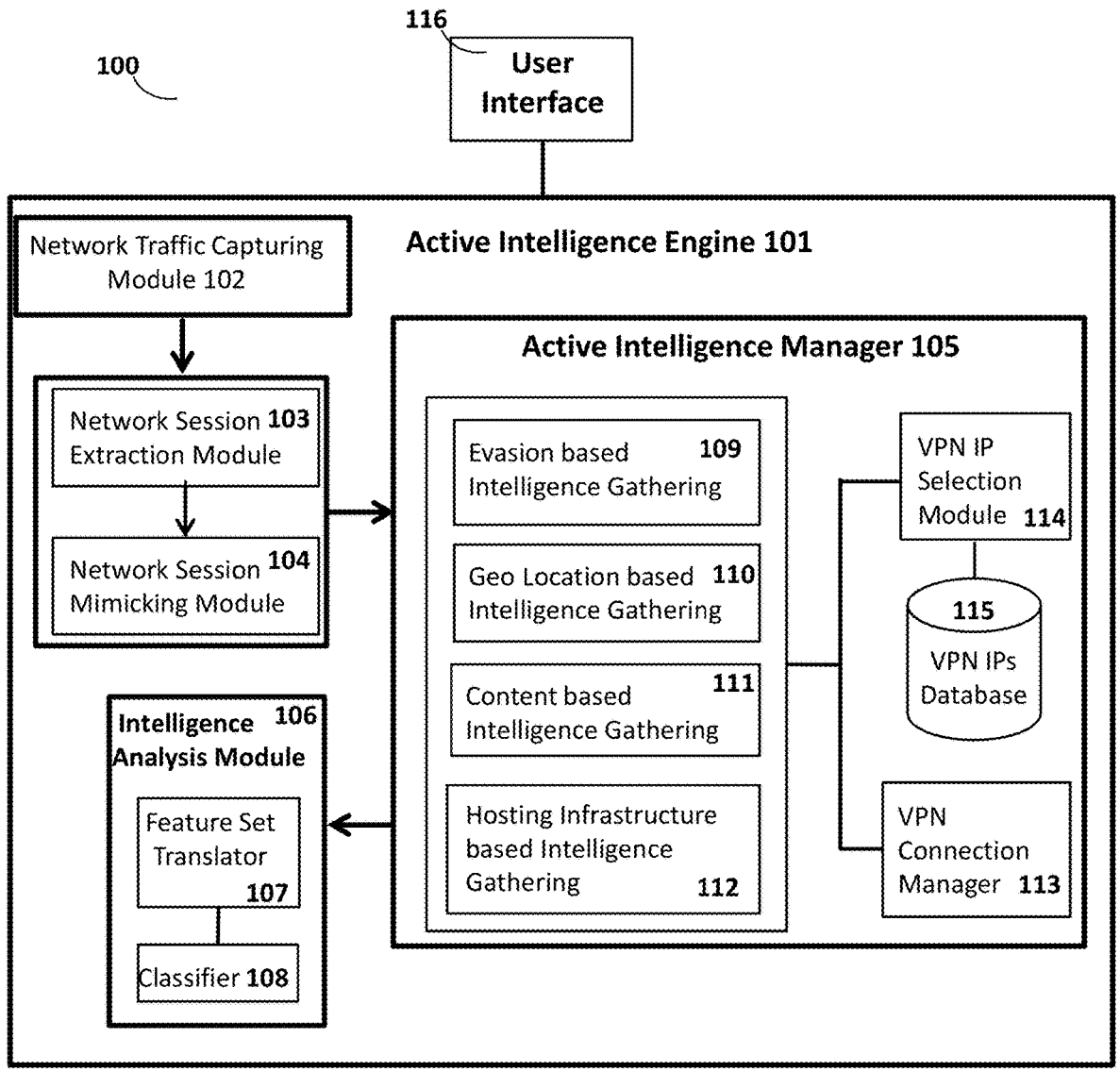

As shown in FIGS. 1A-1B, in an embodiment, an Active Intelligence system 100 comprises a number of functional components, modules, sub-modules, classifiers and databases. Databases can include VPN/Proxy IP address databases and other databases. The VPN/Proxy IP databases may be data repositories that keep track of the status of all IP addresses (IPs) that can be used by the system for probing an online server. The status can include whether the IP is used or new, the geo location of the IP, the connection and health status for each IP, and other status information for IPs. The VPN/Proxy IP database can further maintain a complete usage history for an IP address. For instance, the database can keep track of all connections that made use of a particular VPN/Proxy gateway in the past. Other databases can be included to store the intelligence data collected using the Active Probing process and to store the analysis results generated by the system. The system can comprise one, two, three, four, or more than four different types of databases. Classifiers can include binary classifiers. Binary classifiers can comprise supervised machine learning or other types of classification models that help the overall system in making accurate predictions. For instance, the classifiers can be used for processing a given feature set and making a prediction or providing a justification as to whether the probed server is malicious or not. These classifiers can first be trained by human experts on a set of training data and can later be used for prediction in real time. In addition, these classifiers can be tested on a set of testing data. The system can comprise one, two, three, four, or more than four different types of classifiers. The system can comprise one, two, three, four, five, six, seven, eight, nine, ten, eleven, twelve, thirteen, fourteen, fifteen, or more than fifteen modules or major components.

FIG. 1A is a block diagram that illustrates a number of functional components of an embodiment of an Active Intelligence System 100. The Active Intelligence System 100 may comprise an Active Intelligence Engine 101. The Active Intelligence Engine 101 functions as a managing unit of the overall system. The Active Intelligence Engine 101 can be configured to control all other modules and submodules in the system. The Active Intelligence Engine 101 can comprise an engine that uses some or all other modules systematically to determine whether an online server is malicious, benign, or suspicious.

The Active Intelligence System 100 can comprise modules configured to capture network traffic and select a flow to be investigated further. In some embodiments, a Network Traffic Capturing Module 102 can be included to monitor network traffic in real time. The Network Traffic Capturing Module 102 can be configured to capture various network communications such as requests and responses between clients and servers, clients and clients, and between servers and servers. The clients can be any type, such as for example, desktop, mobile devices, portable devices and any Internet of things (IOT) devices, etc. The servers can be any server that provides service to a client, such as web server, database server, file server, game server, application server, mail server, etc. The servers in some cases can be malicious servers. The malicious servers can be online hosts that are set up and controlled by cyber criminals to perform a variety of malicious activities. For example, the malicious servers can be set up to serve malware binaries, exploits, phishing, and/or credential stealing attacks. Some of these servers act as mother-ships that malware can use to retrieve commands after successfully compromising a machine. The network flow captured by the Network Traffic Capturing Module 102 can include various information such as for example, the identity of the online server (IP, domain, ports, etc.), various protocols, the geo region of the client, and types of messages such as requests and responses. In some embodiments, the network flow can be selected based on a traffic pattern. For example, traffic patterns indicating a server talking to two or more websites, multiple users communicating to multiple websites, or a single user communicating to multiple websites can be selected for further investigation.

A Network Session Extraction Module 103 can be used to parse, separate, and/or extract data (e.g., Session Data). For example, the Network Session Extraction Module 103 can screen and parse all network traffic flow captured by the Network Traffic Capturing Module 102. The Network Session Extraction Module 103 can be configured to separate out Transmission Control Protocol (TCP) and User Datagram Protocol (UDP) flows that comprise variables such as protocol, the geo region of a client, destination IP, destination domain, destination port, and other variables in form of a unique session. In some embodiments, multiple variables including protocol, IP, domain, and port of an online server (destination) can uniquely define a session or an investigation target. In some instances, an investigation target defined by the three variables (protocol, IP, domain, and port) can be investigated once. Alternatively, an investigation target can be investigated multiple times at different points in time. The selected network flow can comprise data packets that contain at least one, two, three, four, or more than four variables and that can include data exchanged between a source (client) and an Internet server (online server). In some cases, the Session Data can be requests and responses between clients and servers. The Network Session Extraction Module 103 can further store the Session Data (e.g., variables and data) in form of data structure. The data structure can be a unique "Session Identity" structure. An example of a "Session Identity" structure is as below.

structure SESSION_IDENTITY {
  proto
  client geo region
  destination domain/ip
  destination port
  data
}

However, it should be noted the example is for illustrative purposes; other formats of data structure and order of variables can be used to store the same information. In some embodiments, the data may be referred to as session data. The "Session Identity" structure can be further used by an "Active Intelligence Manager" module and submodules for Active Probing activities.

A Network Session Mimicking Module 104 can be configured to create replicas of the Session Data extracted by the Network Session Extraction Module 103. As mentioned previously, the Session Data can comprise data packets (e.g., a request) that are exchanged between a client and a server. The replicas of the Session Data can be used in an out-of-band connection between the system and the probed server, such that the target server is not able to distinguish the created session request from an actual request. The replicas of the request packets can have a different identifier for the real client. For example, the replicas of the request packet can modify the packet fields that contain client identity information, such as the http request 'Cookie', Proxy, Authorization headers, and any other client identity information. A client identity field can be filled with dummy data to replace the original data. In some embodiments, the dummy data can have a similar format such that the probed server is not able to distinguish the created client identity from the real client identity.

In some embodiments, the Active Intelligence System 100 comprises an Active Intelligence Manager 105. The Active Intelligence Manager 105 may be responsible for collecting real time intelligence by actively probing (i.e., using an active probing process) an online server. The Active Intelligence Manager 105 can further analyze the collected active intelligence to determine whether the probed online server is malicious or not. In some embodiments, one or more online servers can be probed by the system simultaneously. The Active Intelligence Manager 105 can comprise multiple submodules for gathering active intelligence and multiple submodules for analyzing the collected intelligence. Any number, for example, one, two, three, four, five, or more than five submodules can be included. In some embodiments, the number of modules included can depend on the types of Active Intelligence to be collected and analyzed. In some embodiments, each module can be responsible for a type of active intelligence, as described elsewhere herein. Alternatively, the multiple modules can be collectively used to collect one type of active intelligence.

In some embodiments, the multiple sub-modules can include an Evasion based Intelligence Gathering Sub-Module 109, a Geo Location based Intelligence Gathering Sub-Module 110, a Content based Intelligence Gathering Sub-Module 111, and/or a Hosting Infrastructure based Intelligence Gathering Sub-Module 112.

The Evasion based Intelligence Gathering Sub-Module 109 may be responsible for gathering evasion based intelligence. The Evasion based Intelligence Gathering Sub-Module 109 can collect the evasion based intelligence by examining if an online server is trying to perform any evasion techniques. Hackers who operate malicious server often use different evasion techniques in order to hide their footprints. They are aware that law enforcement may connect to them in order to gather different types of intelligence. Once they find that someone is trying to spy on them, hackers can employ a variety of evasion techniques to distract them. The evasion based intelligence collected by the Evasion based Intelligence Gathering Sub-Module 109 can include evasion activities of the probed server. Such activities can include, for example, resetting the network connections, permanently blocking the connecting IPs, redirecting a connection to a legitimate website, or other activities indicating that the server is trying to evade detection by serving legitimate content instead of malicious content. This Evasion based Intelligence Gathering Sub-Module 109 can use anonymous VPN/Proxy IPs to connect to these online servers so that hackers are not able to track the connection and gathering of intelligence. One or more VPN/Proxy IPs can be used. The VPN/Proxy IPs can be provided by a VPN/Proxy IP Selection Module, as described elsewhere herein.

The Geo Location based Intelligence Gathering Sub-Module 110 may be responsible for collecting Geo Location based intelligence. The Geo Location based Intelligence Gathering Sub-Module 110 can be configured to connect to an online server from different geo locations simultaneously, in order to find out if the online server is behaving the same way across all the geo locations or if its behavior or serving of contents changes with different geo locations. Malicious servers often change their behavior across different geo regions. For example, in the case of a targeted cyberattack toward a company located in the U.S., hackers may only serve malicious contents to an IP located within the U.S. If the same server is accessed through another Geo location like Britain, the hackers may assume that this access is not made by the original victim but by some other entity like law enforcement trying to spy on them. Similarly, hacking groups can set up their servers in such way that they do not infect any victims who live in a country or region they themselves live in. This may be a defensive strategy to avoid the scrutiny of local law enforcement agencies. The Geo Location based Intelligence Gathering Sub-Module 110 can use two or more VPN/Proxy IPs concurrently or nearly concurrently, where at least one IP can be located within the geo region where the actual request was made and at least one IP is located in a different geo location. In some embodiments, the IP located within or outside the geo region of the actual request can be selected based on the geo region variable of the 'Session Identity' structure. The Geo Location based Intelligence Gathering Sub-Module 110 can send a request or instructions to the VPN/Proxy IP Selection Module to select one of the IPs. For example, the instruction can request one IP address that is within the geo region of the actual request, and another IP address can be distant from the real geo region. In some embodiments, the selection of the distant IP address can be made based on historical data or a machine learning result or recommendation. For instance, among all the available distant geo regions, the region with the highest law enforcement power can be selected.

The Content based Intelligence Gathering Sub-Module 111 may be responsible for collecting Content Based Intelligence. The Content based Intelligence Gathering Sub-Module 111 can be configured to gather the intelligence by scanning an online server and downloading all relevant artifacts publicly hosted on this server. The hosted content on a server can take various forms or comprise various types or file formats, such as HTML Code, Images, Java Script, Binaries, etc. The Content based Intelligence Gathering Sub-Module 111 can use a single VPN/Proxy IP to download all artifacts hosted on an online server. Alternatively, the Content based Intelligence Gathering Sub-Module 111 can use more than one VPN/Proxy IP to download all artifacts hosted on an online server.

The Hosting Infrastructure based Intelligence Gathering Sub-Module 112 may be responsible for collecting Hosting Infrastructure based Intelligence. The Hosting Infrastructure based Intelligence Gathering Sub-Module 112 can be configured to gather and check security posture and quality of an online server's hosting infrastructure. For instance, the sub-module can check the number of opened ports on the online server, the type of software components installed on the server such as a web server, protocols supported by the server such as http, https, irc, ftp, ssh, etc and server response time, etc. In some cases, the Hosting Infrastructure based Intelligence Gathering Sub-Module 112 can use a single VPN/Proxy IP to scan the entire or a portion of the probed server.

The Active Intelligence System 100 may comprise a plurality of modules to provide VPN/Proxy IPs to be used in the Active Probing process. In some embodiments, the Plurality of modules can include a VPN/Proxy Connection manager 113, a VPN/Proxy IP Selection Module 114, and a VPN/Proxy IP Database 115.

The VPN/Proxy Connection manager 113 may be referred to as VPN/Proxy Connection module. The VPN/Proxy Connection manager 113 may be responsible for establishing a VPN/Proxy tunnel to the requested online server. The VPN/Proxy connection manager 113 can establish a connection to the online server through its gateway and initiate the session request process. The connection can use a VPN/Proxy gateway IP provided by the VPN/Proxy IP Selection Module and a request packet generated by the Network Session Mimicking Module. During this session, multiple request and response packets can be exchanged through VPN/Proxy gateways and the online server under investigation.

The VPN/Proxy IP Selection Module 114 may be responsible for managing, recycling, and selecting VPN/Proxy IPs to be used by the plurality of modules as described elsewhere herein. These VPN/Proxy IPs can be used to establish one or more connections to the online server under investigation. During an Active Probing process, the VPN/Proxy IPs can be selected for various purposes. For example, the same VPN IP cannot be used again to connect to the same online server under investigation. In another example, the VPN IP can be selected based on geo location to be used by the Geo Location based Intelligence Gathering Sub-Module 110. For instance, the VPN/Proxy IP Selection Module 114 can be asked for an IP located in a particular Geo location such as the U.S., Russia, etc. When a geo location may be requested, the VPN/Proxy IP Selection Module 114 can be configured to release IPs located in the requested regions only.

The VPN/Proxy IP Database 115 may be configured to keep track of all free, used, and currently used IPs. The VPN/Proxy IP Database 115 may comprise data repositories that keep track of the status of all IPs that can be used by the system for probing an online server. The status can include whether the IP is used or new, the geo location of the IP, the connection and health status for each IP, and other status information. The VPN/Proxy IPs Database 115 can further maintain a complete usage history for an IP address. For instance, the database can keep track of all connections that made use of a particular VPN/Proxy gateway in the past.

The Active Intelligence System 100 may comprise a plurality modules and submodules for analyzing the collected intelligence data. In some embodiments, the plurality of modules can include an Intelligence Analysis Module 106, Feature Set Translator Module 107, and/or a classifier 108.

The Intelligence Analysis Module 106 may be responsible for receiving intelligence from the intelligence gathering modules and combining and analyzing the received intelligence using a machine learning based classification engine. The Intelligence Analysis Module 106 can use the Feature Set Translator Module 107 to convert gathered intelligence into a combined final feature set that can be understood and processed by the classifier(s). The final feature set may be then handed over to a pre-trained machine learning classifier 108 that, based on the supplied final feature set, makes the final determination as to whether the online server is malicious or benign.

The Feature Set Translator Module 107 may be responsible for converting raw intelligence or data into different types of machine learning features. In some embodiments, these features can be of different types, such as for example, binomial (or binary features), nominal (or discrete features), and numeric features. This module can further combine all features in form of a final feature set that can be processed by the Classifier.

Below is a list of Feature Examples:
1. Binary Features
server_blocking_connection {TRUE, FALSE)
2. Nominal Features
content_served {html, binaries, java_script, images, etc . . . }
3. size_of_downloaded_contents_in_bytes {numeric}

For example, a binary feature may comprise a server_blocking_connection variable which has a value of TRUE if the server is blocking a connection request from a client or has a value of FALSE if the server is not blocking a connection request from a client. For example, a nominal feature may comprise a content_served variable which contains the file types or file formats of content served by a server (e.g., html, binaries, java_script, images, etc.). For example, a numeric feature may comprise a size_of_downloaded_contents_in_bytes variable which contains the numerical size of content (an html file, a binary file, a java script, or an image) downloaded from a server in bytes.

The classifier 108 may be responsible for processing a given Feature Set processed by the Feature Set Translator Module 107 and making a prediction as to whether the server under investigation is malicious. In some embodiments, the classifier can be a binary classifier. Such a binary classifier can comprise a machine learning model that can help the overall system in making accurate predictions. Various methods can be used for binary classification such as, for example, decision trees, random forests, Bayesian networks, support vector machines, neural networks, logistic regression. In other embodiments, more than two categories of classification (e.g., malicious, benign, and suspicious) can be included. These classifiers can be first trained by human experts on a set of training data and are later used for prediction in real time. In addition, these classifiers can be tested on a set of testing data.

FIG. 1B illustrates a block diagram of the system, in accordance with an embodiment. As shown in the figure, the Active Intelligence system 100 can include a user interface 116. The user interface 116 can be operably coupled to the various components of the system. As mentioned previously, the Active Intelligence System 100 can comprise an Active Intelligence Engine 101 that manages the overall system. The Active Intelligence System 100 can comprise modules for capturing network traffic, such as the Network Traffic Capturing Module 102, and multiple modules such as the Network Session Extraction Module 103 and/or Network Session Mimicking Module 104 for generating Session Identity structure data used for active probing. The Active Intelligence System 100 may further comprise an Active Intelligence Manager 105 for active probing and collecting intelligence from the target server by establishing a connection to the server. The Active Intelligence Manager 105 can include a plurality of intelligence gathering modules (e.g., Evasion based Intelligence Gathering module 109, Geo Location based Intelligence Gathering module 110, Content based Intelligence Gathering module 111, and/or Hosting Infrastructure based Intelligence Gathering module 112). The Manager 105 can further utilize VPN IPs provided by a plurality of VPN IP managing modules and databases (e.g., VPN IP Selection module 114, VPN Connection Manager 113, and VPN IPs Database 115). The Active Intelligence System 100 can further comprise an Intelligence Analysis Module 106 for analyzing the collected intelligence and for determining whether the probed server is malicious. The Intelligence Analysis Module 106 can include submodules (e.g., Feature Set Translator module 107 and Classifier 108) to convert the raw intelligence or data to a feature set that can be analyzed by various machine learning techniques used by the classifier 108.

Figure 2:
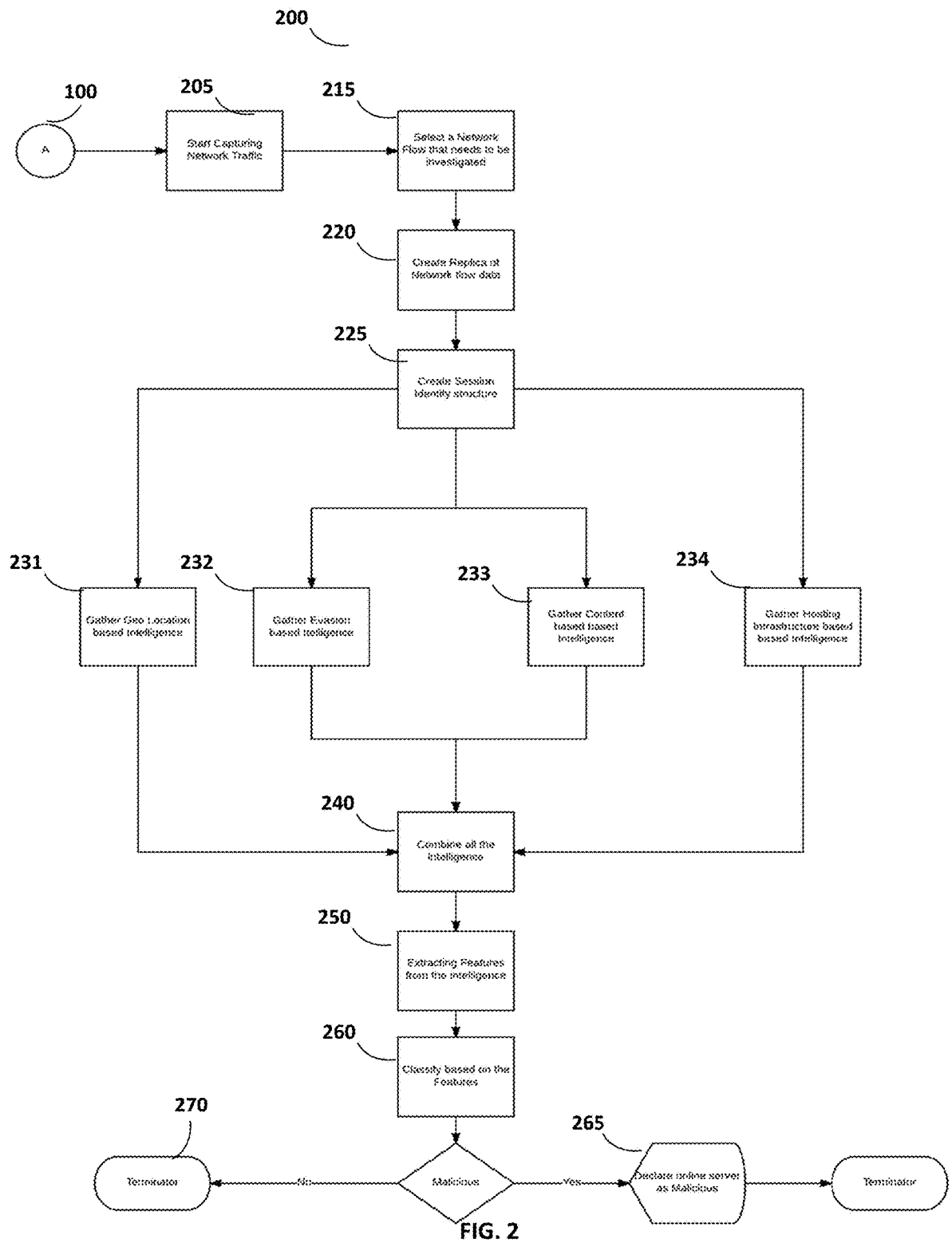
FIG. 2 is a flowchart showing an exemplary method for detecting an online malicious server.

FIG. 2 is a flowchart showing an exemplary method for detecting an online malicious server. An Active Intelligence System 100 can be engaged at step 205 to start monitoring and capturing network traffic between one or more clients and one or more Internet servers. From this monitored network traffic, an Internet communication between a client and a server can be selected for further investigation and a network flow can be extracted from the Internet communication at step 215. In some embodiments, the network flow can be selected based on the traffic pattern. For example, if the traffic shows a server talking to two or more websites, or if multiple users communicate to multiple websites, or a single user to multiple websites, these scenarios can be selected for further investigation. The network flow can consist of one or more variables related to the Internet communication between the client and the server. A replica of the network flow data can be created at step 220 which can then be used to create a session identity structure at step 225. The session identity structure can be processed and one or more types of forensic intelligence related to the operation of the server can be collected or gathered at steps 231-234 using the processed session identity structure. The multiple types of forensic intelligence can be collected simultaneously or sequentially. In some embodiments, all or some of the four types of intelligence are collected and analyzed. In some embodiments, one or more VPN IPs can also be used for collecting or gathering intelligence at steps 231-234. The collected one or more types of forensic intelligence can be combined at step 240 and features from the combined forensic intelligence can be extracted at step 250. The server under investigation can be classified at step 260 as malicious 265 or benign 270 based on the extracted features.

Figure 3:
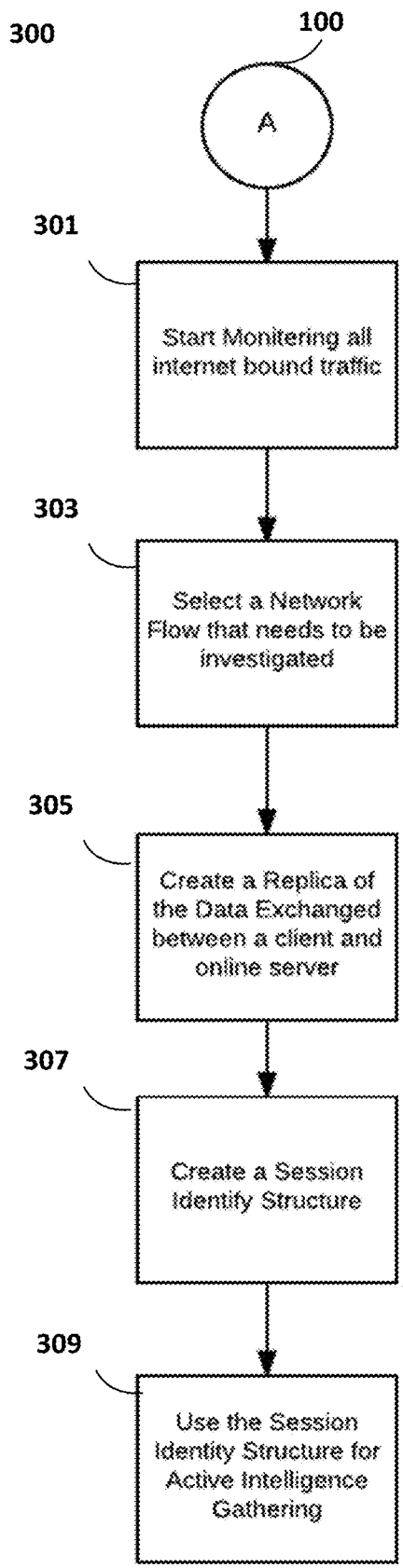
FIG. 3 is a flowchart showing an exemplary method for constructing a session identity structure from monitored and captured Internet traffic.

The process of creating or constructing a session identity structure from monitored and captured Internet traffic is further depicted in FIG. 3. In particular, once the Active Intelligence System 100 (e.g., as shown in FIGS. 1A-1B) has been engaged at step 301, the system can start monitoring and capturing all Internet-bound traffic between one or more clients and servers. The process of monitoring and capturing network traffic can be performed, for example, by the Network Traffic Capturing Module 102. The captured Internet flow can be parsed by the Network Session Extraction Module 103 in order to select a network flow that needs to be investigated 303. In some embodiments, each unique TCP and/or UDP network flow can be separated out by the Network Session Extraction Module 103. The unique TCP and/or UDP network follow can comprise at least one, two, three, four, five, or more than five variables, such as destination (online server) IP, destination Port, protocol, and geo locations of source (client) IP and data. As described previously, the data can comprise the session data (e.g., requests and/or responses) exchanged between the client and the server. The Network Session Mimicking Module 104 can be engaged at step 305 to create a replica of the session data as described previously herein. The created session data can be a replica of the original session data with exception of the data fields that contains identity information of the real client. The created session data can replace the original client identity data with dummy data to impersonate a different client. Next, the Network Session Mimicking Module 104 can create or generate a Session Identity Structure 307, including the five variables destination (online server) IP, destination Port, protocol, geo location of source (client) IP, and the created session data as described elsewhere herein. The Session Identity Structure can be further used by the Active Intelligence Gathering modules to gather intelligence in real time 309.

Figure 4:
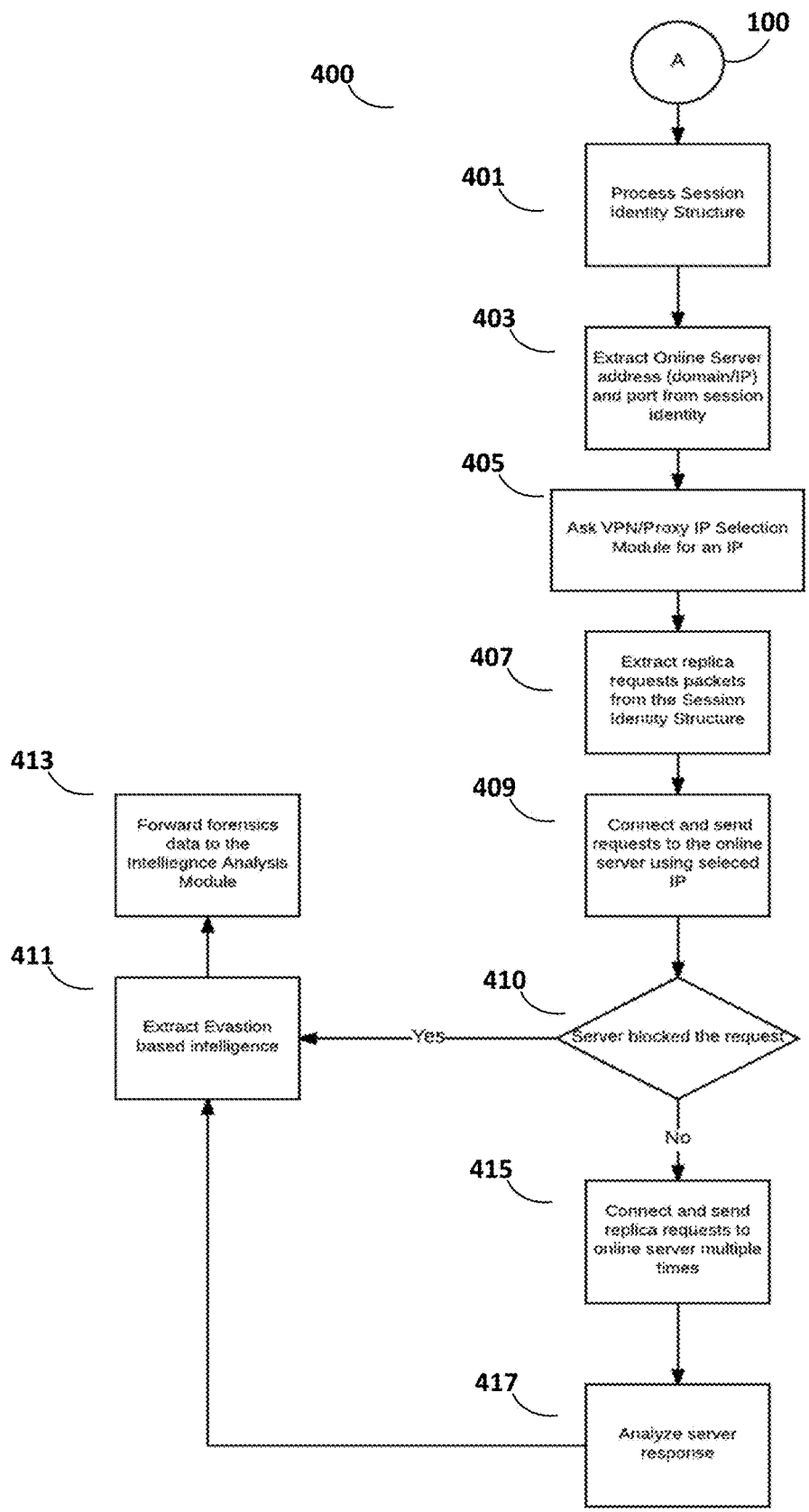
FIG. 4 is a flowchart showing an exemplary method for the collection of evasion based intelligence.

FIG. 4 is a flowchart showing an exemplary method for the collection of evasion based intelligence. The evasion based intelligence collection process 400 can be performed by the one or more sub-modules of the Active Intelligence Manager 105 such as the Evasion based Intelligence Gathering Sub-Module 109 and VPN/Proxy IP selection and connection modules. At step 401, the Evasion based Intelligence Gathering Sub-Module 109 can be configured to process the Session Identity structure created by the process described in FIG. 3 to extract the domain/IP and destination port of the online server at step 403. Next, at step 405, the sub-module can request an available VPN/Proxy gateway IP from the VPN/Proxy Selection Module to be used to connect to the online server. In some embodiments, along with the request, the identity information (e.g., domain and port) of the to-be-connected online server can be included such that the selection Module can select an appropriate VPN/Proxy IP that was not used for connecting to the specific server. Other requirements can also be incorporated in the request to select a VPN/Proxy IP for the system to impersonate an anonymous VPN/Proxy server. At step 407, once the Evasion based Intelligence Gathering Sub-Module 109 receives the VPN/Proxy gateway IP, the sub-module can extract the Session Data Replica packet from the Session Identity Structure. At step 409, the VPN/Proxy Connection Manager 113 can establish a connection to the online server using the selected VPN/Proxy gateway IP and send the replica request packet to the online server. Next, the Evasion based Intelligence Gathering Sub-Module 109 can monitor and observe the presence of evasion activities of the online server. For example, the online server can be monitored to check if it is trying to block the connection at step 410. If the online server is not blocking the first request, the Evasion based Intelligence Gathering Sub-Module 109 can send a number of additional requests at step 415 to test if the online server is blocking the connection after multiple requests. In addition to examine blocking connection behavior of the online server, various other evasion behaviors can be examined. In some embodiments, the Evasion based Intelligence Gathering Sub-Module 109 can also examine or analyze the response received after multiple requests at step 417. The sub-module can compare the response received to a response that was served to a real client. A difference in the two responses can indicate that the online server is trying to hide its malicious content. The Evasion based Intelligence Gathering Sub-Module 109 can then extract Evasion based intelligence at step 411 from the server responses and then forward the forensics data to the Intelligence Analysis Module 106 at step 413.

Figure 5:
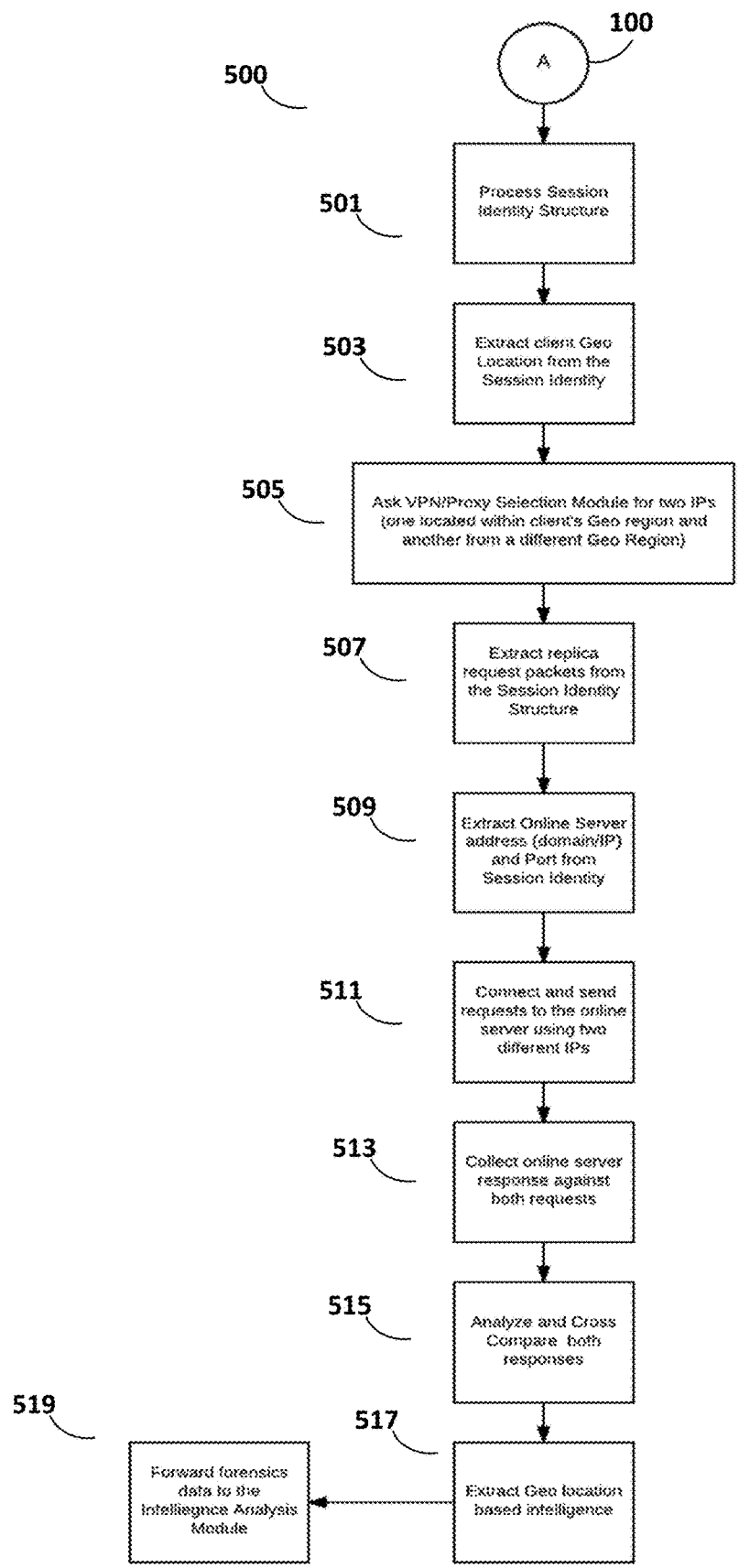
FIG. 5 is a flowchart showing an exemplary method for the collection of geo location based intelligence.

FIG. 5 is a flowchart showing an exemplary method for the collection of geo location based intelligence. In some embodiments, one or more sub-modules of the Active Intelligence Manager 105 such as the Geo Location based Intelligence Gathering Sub-Module 110 and VPN/Proxy IP Selection and VPN Connection Manager Modules, 114 and 113 respectively, can be involved in the process 500. A purpose of the Geo Location based intelligence gathering process may be to find out if an online server is behaving the same way across various geo locations or if its behavior or content being served changes across different geo locations. At step 501, the Geo Location Based Intelligence Gathering Sub-Module 110 can be configured to process the Session Identity structure created by the process described in FIG. 3 and to extract the client Geo Location information at step 503. In some embodiments, the domain/IP and destination port of the online server can also be extracted at step 503. Next, the Geo Location Based Intelligence Gathering Sub-Module 110 can request two or more available VPN/Proxy gateway IPs from the VPN/Proxy Selection Module to be used to connect to the online server at step 505. In the request, information regarding the geo location of the client can be included such that the VPN/Proxy IP Selection Module can select at least one IP within the Geo Region and at least one IP from a different geo location. Other requirements can also be incorporated in the request to select a VPN/Proxy IP for the system to impersonate an anonymous VPN/Proxy server. For example, the identity information (e.g., domain and port) of the to be connected online server can be included such that the VPN/Proxy IP Selection Module can select an appropriate VPN/Proxy IP that was not used for connecting to the specific server. At step 507, once the Geo Location based Intelligence Gathering Sub-Module 109 receives the VPN/Proxy gateway IP, the sub-module can extract the Session Data Replica packet from the Session Identity Structure. If the online server address is not extracted from previous steps, the Geo Location Based Intelligence Gathering Sub-Module 110 can extract the domain/IP and port of the online server from the Session Identity structure at step 509. At step 511, the VPN/Proxy Connection Manager 113 can establish a connection to the online server using the selected two or more VPN/Proxy gateway IPs and send the same replica request packets to the online server simultaneously. Next, at step 513, the Geo Location Based Intelligence Gathering Sub-Module 110 can collect the response from the online server to the same session requests sent from the different IPs. The Geo Location Based Intelligence Gathering Sub-Module 110 can then analyze and cross compare the responses at step 515 to determine whether they are the same or geo-dependent. At step 517, various geo location based intelligence can be extracted based on the collected responses. An examination can be conducted to observe whether the online server is trying to behave differently when connected through different Geo locations. Malicious servers are known to change their behavior across different geo locations. Accordingly, if the responses are different or geo location dependent, it can be an indication that the online server may be selectively infecting clients in a specific region. Moreover, analysis results showing that the online server is trying to block the connection when connected through a foreign geo region can indicate that hackers are avoiding entities located in a specific region. The Geo Location based Intelligence Gathering Sub-Module 110 can extract Geo Location based intelligence from the server responses at step 517 and forward the forensics data to the Intelligence Analysis Module 106 at step 519.

Figure 6:
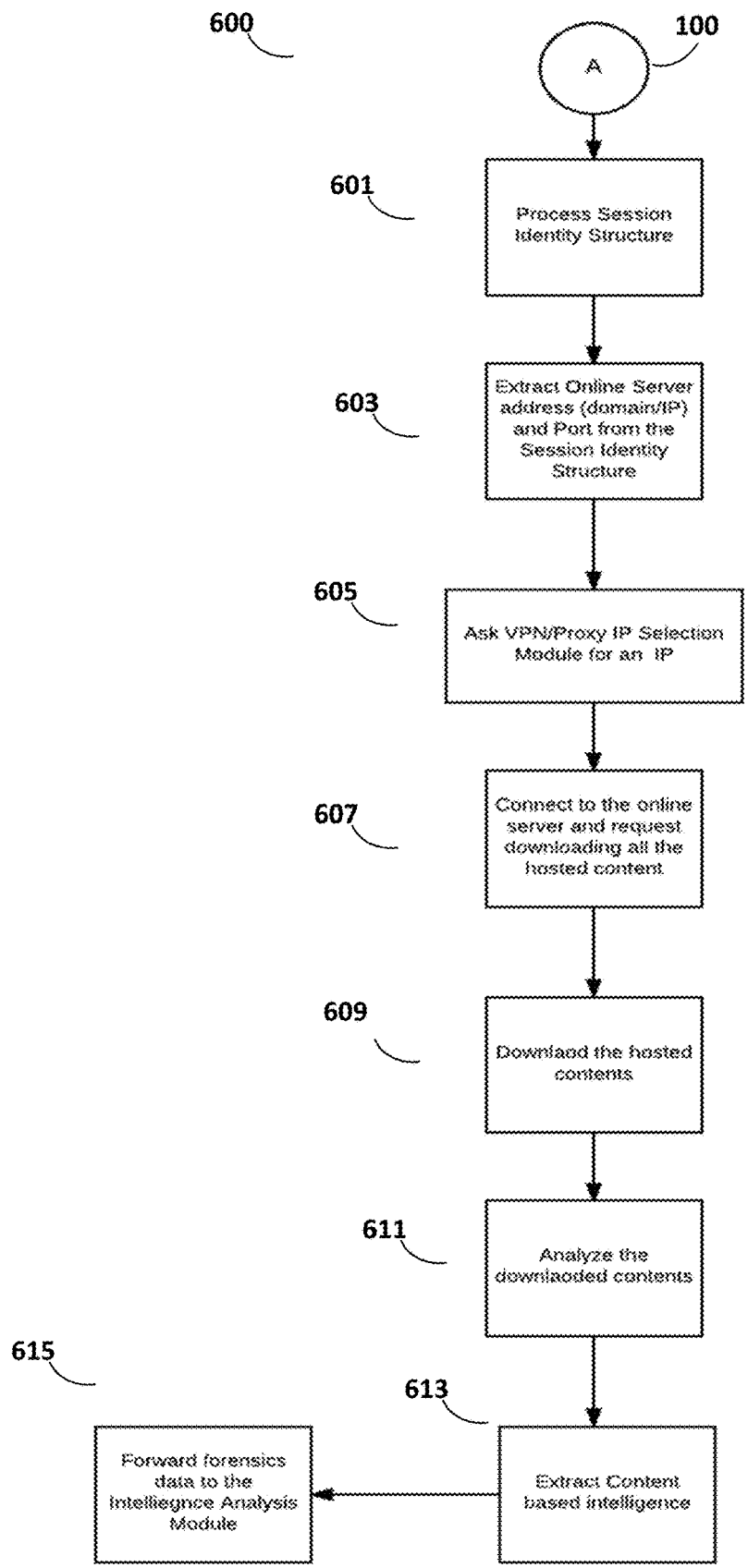
FIG. 6 is a flowchart showing an exemplary method for the collection of content based intelligence.

FIG. 6 is a flowchart showing an exemplary method for the collection of content based intelligence. In some embodiments, one or more sub-modules of the Active Intelligence Manager 105, such as the Content based Intelligence Gathering Sub-Module 111 and/or VPN/Proxy IP selection can be involved in the process 600. The content based intelligence gathering process 600 can gather intelligence by scanning an online server and downloading all relevant artifacts hosted on the server. The hosted content on a server can comprise various types of content or file formats such as HTML code, images, Java Script, Binaries, or other hosted content. At step 601, the Content Based Intelligence Gathering Sub-Module 111 can be configured to process the Session Identity structure created by the process described in FIG. 3 and to extract the domain/IP and destination port of the online server at step 603. Next, at step 605, the Content Based Intelligence Gathering Sub-Module 111 can request an available VPN/Proxy gateway IPs from the VPN/Proxy Selection Module to be used to connect to the online server. In some embodiments, along with the request, the identity information (e.g., domain and port) of the to-be-connected online server can be included such that the selection Module can select an appropriate VPN/Proxy IP that was not used for connecting to the specific server. Other requirements can also be incorporated in the request to select a VPN/Proxy IP for the system to impersonate an anonymous VPN/Proxy server. At step 607, once the Content based Intelligence Gathering Sub-Module 111 receives the VPN/Proxy gateway IP, the VPN/Proxy Connection Manger 113 can establish a connection to the online server using the selected VPN/Proxy gateway IP and send a request packet to the online server to request download all the hosted content. Next, at step 609, the Content Based Intelligence Gathering Sub-Module 111 can download the hosted content from the online server. The Content Based Intelligence Gathering Sub-Module 111 can then analyze the downloaded contents at step 611. Various analyses can be performed to analyze the contents. For example, if an online server is serving a large amount of legitimate content, such behavior can be an indication that the online server is not part of a criminal infrastructure. Similarly, if an online server is serving a small amount of legitimate content, such behavior can be an indication that the online server is likely or suspicious to be part of a criminal infrastructure. In another example, active probing for additional artifacts gives the Active Intelligence System 100 a unique ability to analyze contents that were not accessed by the real client, for instance, if the real client was seen downloading an executable from the online server. During content probing, the Active Intelligence System 100 can find more binaries and even other types of malicious artifacts like Exploits, Phishing pages, Spam templates hosted on the same server. Downloading all hosted content may provide more data points to the system and increase the accuracy of the decision. The Content based Intelligence Gathering Sub-Module 110 can then extract Content based intelligence from the server responses at step 613 and forward the forensics data to the Intelligence Analysis Module 106 at step 615.

Figure 7:
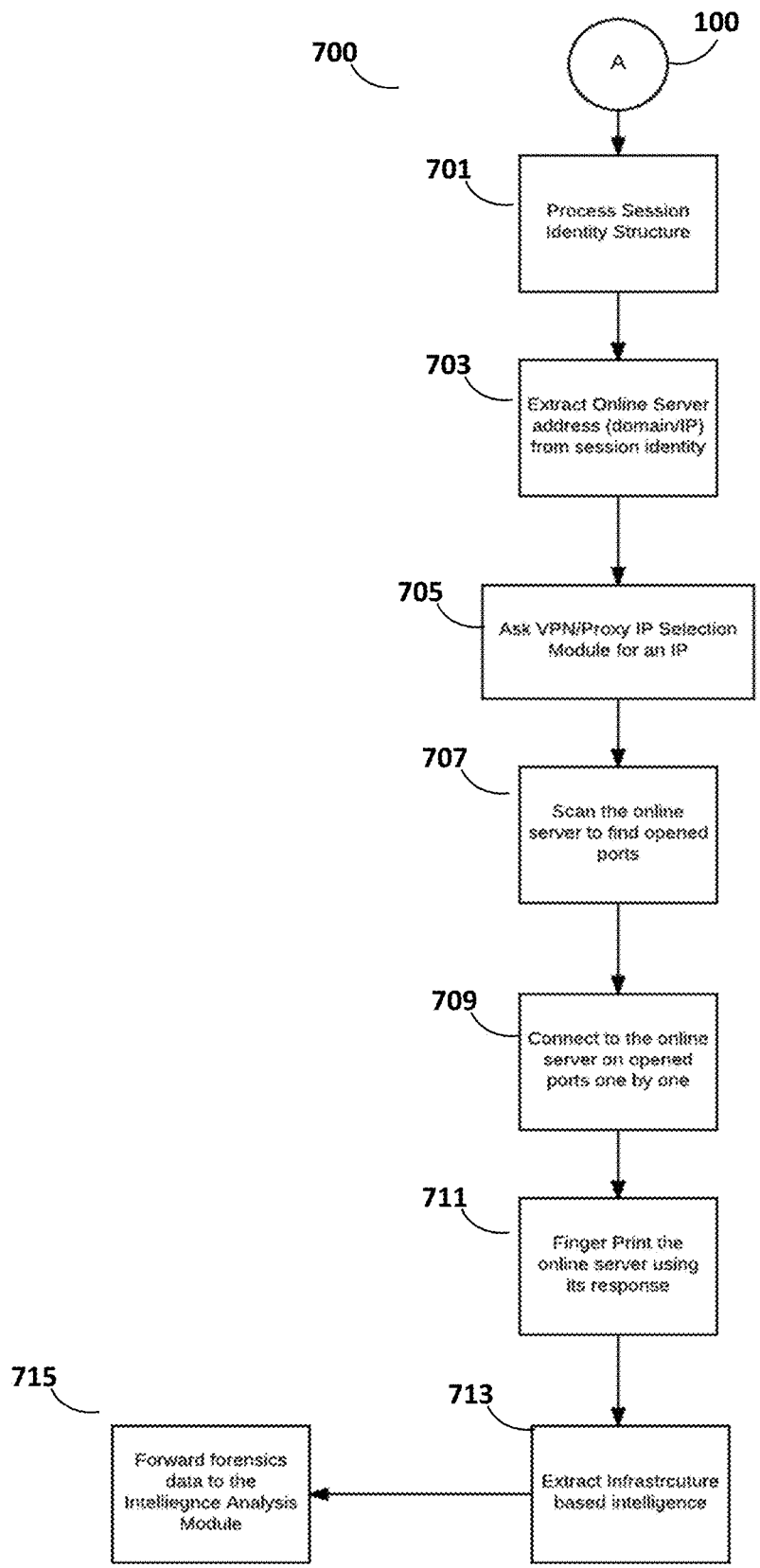
FIG. 7 is a flowchart showing an exemplary method for the collection of hosting infrastructure based intelligence.

FIG. 7 is a flowchart showing an exemplary method for the collection of hosting infrastructure based intelligence. This hosting infrastructure based intelligence may be gathered by checking security posture and quality of an online server hosting infrastructure. Normally, as compared to legitimate servers, malicious servers are often hosted on cheap infrastructures with poor security postures. These malicious servers are typically set up quickly in a short period of time to be used for a limited time. Once these servers appear on security vendor's black lists, hackers may abandon these servers and move to new hosting infrastructure. Similarly, malicious servers may be overwhelmed by connections originating from infected machines world-wide. Most of the time, such servers would respond very slowly to requests. As part of its intelligence gathering process, the system may also look for all open ports on the online server and uses this information to examine the server components hosted on the server. Various features of the online server can be examined, including for example, the response of the server to a request, number of opened ports on the online server, types of software installed on the online server, and protocols used by the online server. In some embodiments, one or more sub-modules of the Active Intelligence Manager 105 such as the Hosting Infrastructure based Intelligence Gathering Sub-Module 112 and/or VPN/Proxy IP selection can be involved in the process 700. The Hosting Infrastructure based intelligence gathering process 700 can gather intelligence by checking the security posture and quality of an online server hosting infrastructure. At step 701, the Hosting Infrastructure Based Intelligence Gathering Sub-Module 112 can be configured to process the Session Identity structure created by the process described in FIG. 3 to extract the domain/IP and destination port of the online server at step 703. Next, at step 705, the Hosting Infrastructure Based Intelligence Gathering Sub-Module 112 can request an available VPN/Proxy gateway IP from the VPN/Proxy Selection Module to be used to connect to the online server. In some embodiments, along with the request, the identity information (e.g., domain and port) of the to-be-connected online server can be included such that the selection Module can select an appropriate VPN/Proxy IP that was not used for connecting to the specific server. Other requirements can also be incorporated in the request to select a VPN/Proxy IP for the system to impersonate an anonymous VPN/Proxy server. At step 707, once the Hosting Infrastructure based Intelligence Gathering Sub-Module 112 receives the VPN/Proxy gateway IP, the Sub-Module can scan the online server to find the opened ports. Next, the VPN/Proxy Connection Manager can establish a connection to the open port of the online server one by one at step 709. For each connection, the Hosting Infrastructure Based Intelligence Gathering Sub-Module 112 can collect fingerprint of the online server by analyzing various features, responses, performance of the online server in response to the request sessions at step 711. The Hosting Infrastructure based Intelligence Gathering Sub-Module 112 can then extract Hosting Infrastructure based intelligence from the server fingerprint at step 713 and forward the forensics data to the Intelligence Analysis Module 106 at step 715.

Figure 8:
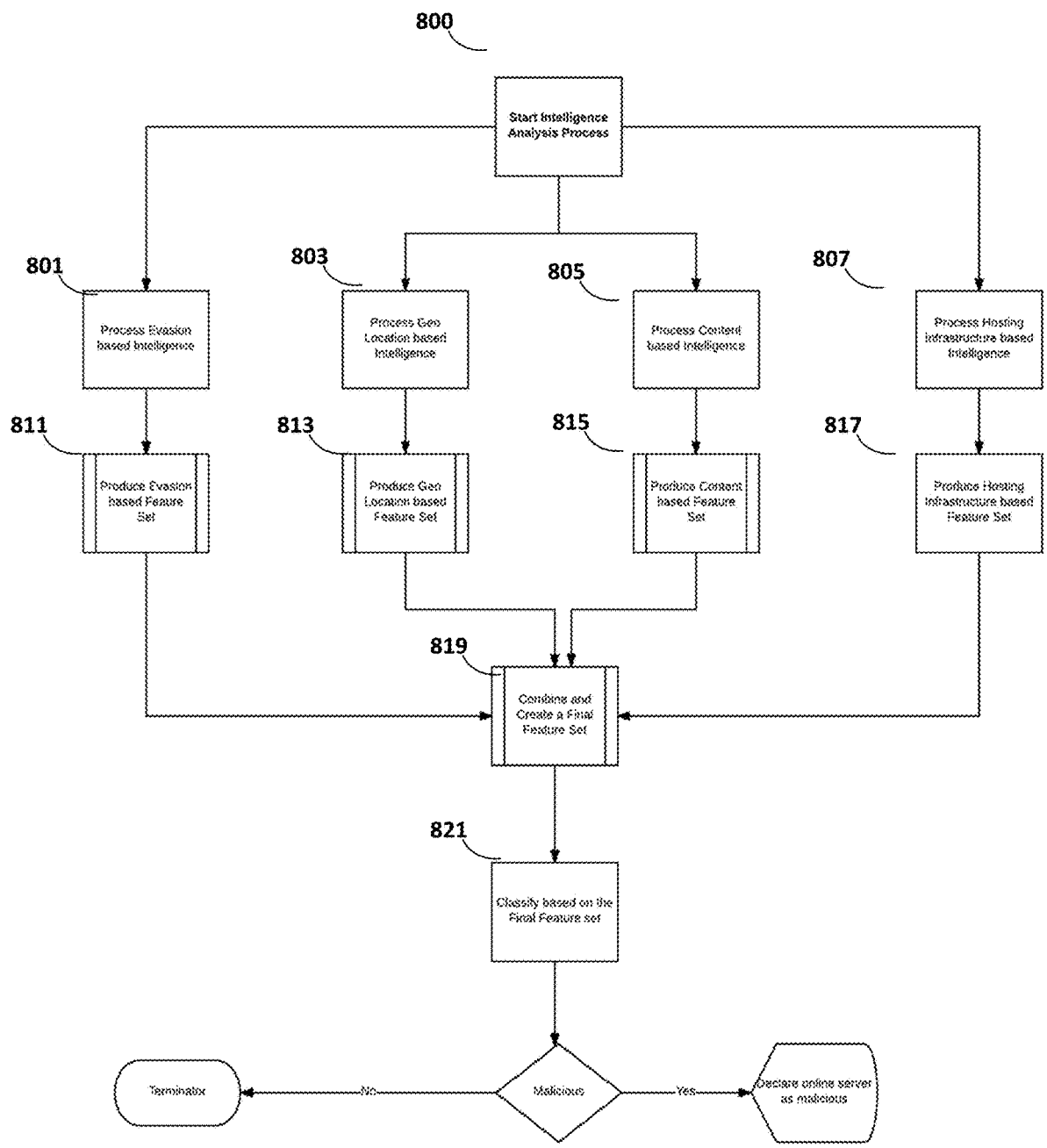
FIG. 8 is a flowchart showing an exemplary method for analyzing the collected intelligence and classification of the server as malicious or benign.

FIG. 8 is a flowchart showing an exemplary method for analyzing the collected intelligence and classification of the server as malicious or benign. The intelligence analysis process 800 can involve an Intelligence Analysis Module 106 and/or sub-modules. The Intelligence Analysis Module 106 can be used to process various types of intelligence and determine if this intelligence is sufficient to declare an online server as malicious. As shown in FIG. 8, the steps 801, 803, 805, and/or 807 can be performed by the Feature Set Translator sub-module 107 to convert the raw data intelligence collected from various processes described herein, including the evasion based intelligence process 400, Geo location based intelligence process 500, content based intelligence process 600 and Hosting Infrastructure based process 700. The Feature Set Translator sub-module 107 can process each type of intelligence and translate the intelligence into features at steps 811, 813, 815, and 817, that can be combined to create a final feature set that can then be used by a classifier. The features can be for example Binary Features such as server_blocking_connection {TRUE, FALSE), Nominal Features such as conetent_served {html, binaries, java_script . . . }, and numeric features such as size_of_downloaded_contentst_in_bytes {numeric}. The Feature Set Translator sub-module 107 can combine all these features in form of final feature set at step 819. The final feature set can be further processed by a binary classifier using a trained machine learning model to declare if the server is malicious or not at step 821.

The Active Intelligence system 100 can display or present information to a user or system administrator through a user interface 116, or portal. The user interface 116 can be the same as described in FIG. 1B. A user or system administrator can log in to the portal or access the portal by entering a user name and password. In some instances, the process to log in can require two factor authentication, wherein the user must authenticate by providing a password that was supplied through other means e.g., by a dongle, via text to a mobile device, or through an eternal application run on a mobile device.

Figure 9:
FIG. 9 is a screen capture of an Event Notification and Control and Command page viewed via a user interface of an exemplary embodiment.
Figure 10:
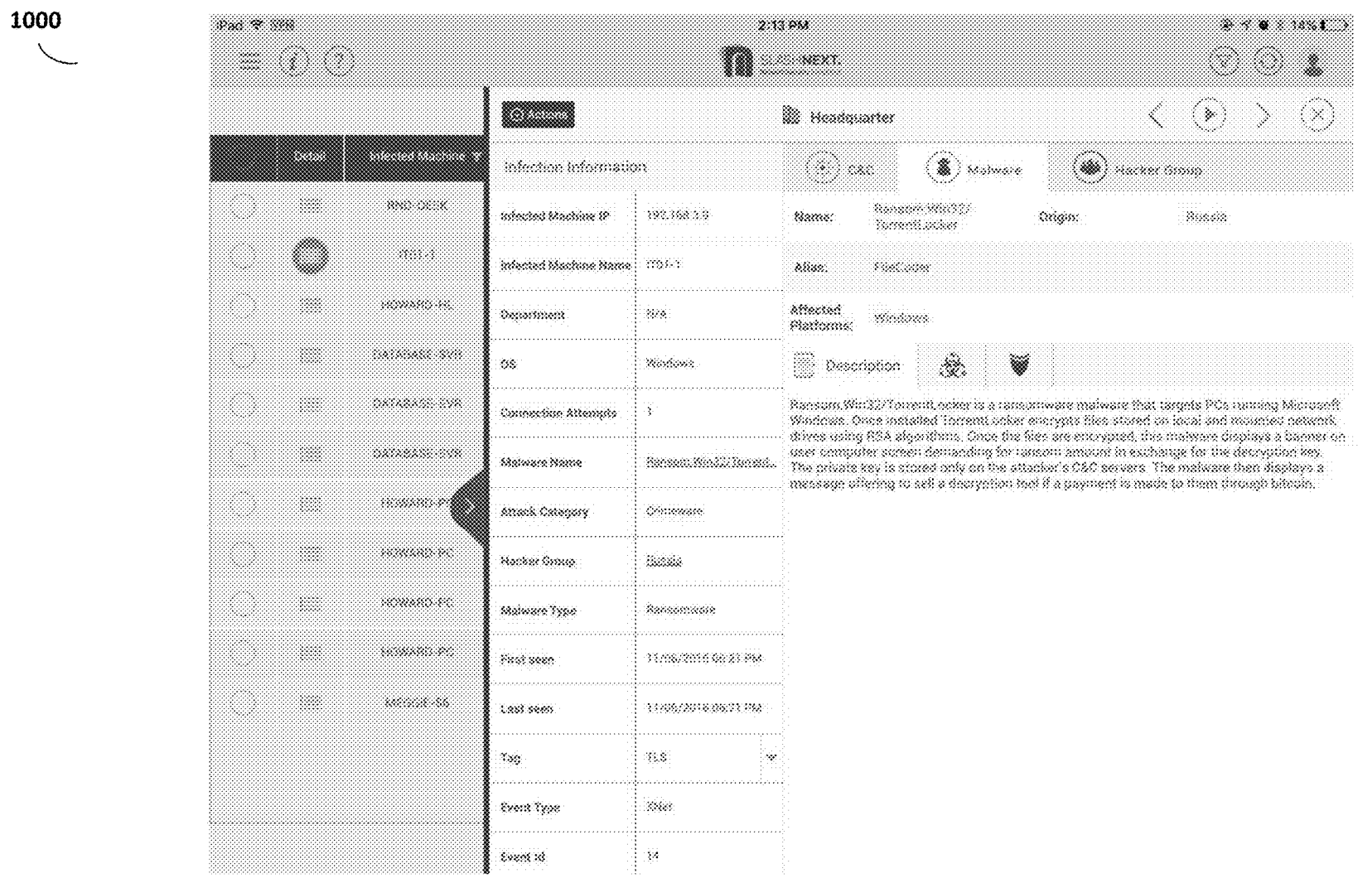
Figure 11:
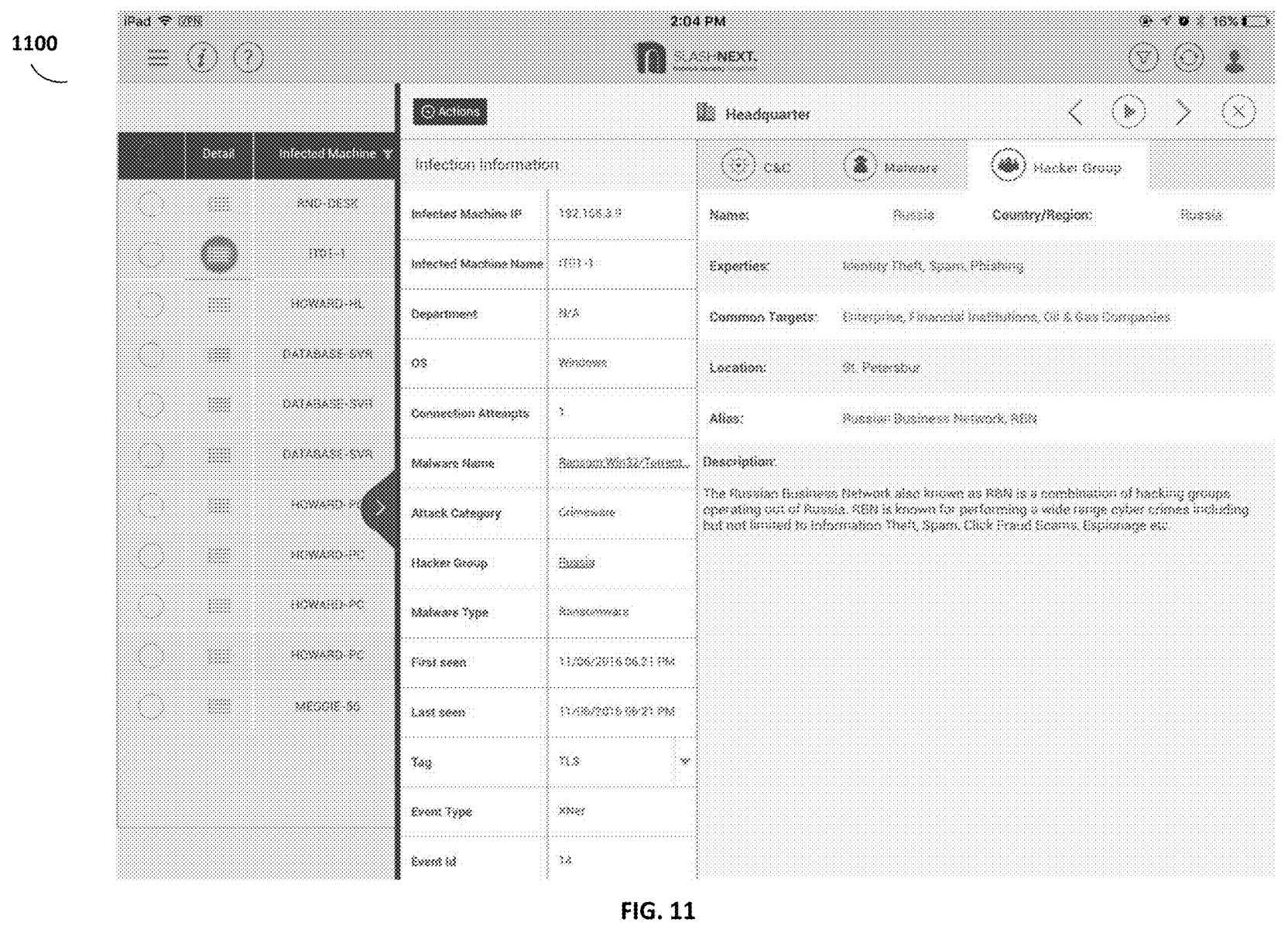

A user interface 116 of an Active Intelligence System 100 can comprise information shown on a dashboard regarding the identity of the malicious online server on the network, as well as additional details regarding the location, usage, malware type, or other features of the machine, including the type of the machine and the identity and various features of the hacker group. For example, FIGS. 9-11 show screen captures of a dashboard viewed via an interface (e.g., a user interface 116 of an Active Intelligence System 100) of an exemplary embodiment that includes information regarding the identity of malicious servers on the network as well as the other information described above. Additional information provided on various pages or views of the dashboard can include the information about the machine used by the Active Intelligence System 100, such as the IP address of the Infected machine (e.g., 192.168.3.9), the name or Identifier of the infected machine (e.g., ITO1-1), the department that uses the machine or to which the machine was registered (e.g., N/A), and the operating system (e.g., Windows).

As shown in FIGS. 9-11, a user interface 116 of an Active Intelligence System 100 can also present a user with details regarding a connection attempts during an Active Probing process. Details regarding the attacker can include the number of connection attempts made by the malicious server, the name of the Malware (i.e., brand and method used by an attacker) identified by the Active Intelligence System 100, the affected platforms (e.g., Windows), the origin of the Malware (e.g., Russia), the hacker group that performed the attack (e.g., Russia), the expertise of the hacker group (e.g., identity theft, spam, phishing), the common targets (e.g., enterprise, financial institutions, oil & gas companies), geo locations (e.g., St. Petersburg), Alias (e.g., Russian Business Network, RBN), and the first date and/or time and the last date and/or time an attack was detected or registered.

A user interface 116 of an Active Intelligence System 100 can further include reference information or labels that can be of used for internal reference to the event or prioritization of events. Examples can include a tag indicating the communication protocol (e.g., Transport Layer Security or TLS), the event type (e.g., XNet), and an event identification or ID (e.g., 14) that can be used to refer to the particular event.

A user or system administrator can log-in to the Active Intelligence System 100 from a remote location or when connected to or on the physical network. Upon login and authentication a user can be presented with screens similar to those depicted in FIGS. 9-11. In some instances a system administrator may wish to review the malicious online servers that are detected through accessing each VNP/Proxy server. To accomplish this, the system administrator can select an infected Machine from the list of infected Machines. The user may then be able to view details for infected machines and the detected malicious online server on the network. The details can include the nature or details regarding a specific machine specific attack, specific incident, a compiled set of attacks performed by a particular group, the attacks on a particular day or time, and/or attacks that have occurred from a particular location or region.

A system administrator can select an infected machine, for example HOWARD-PC, as selected in FIGS. 9-11, and view details regarding the detected malicious server. Details regarding HOWARD-PC can be shown under the infection information, where the IP, Machine Name, Department, and Operating System details are presented. Also presented in this example are the number of connection attempts, the malware name, attack category, hacker group, malware type, date, and time the attackers were first seen and then last seen, as well as tags including the communication protocol, event type, and a unique number that corresponds to the specific event. On the far right side of the dashboard display, additional details regarding the attack can be presented to the user or system administrator through a user selection of one or more tabs to access different pages or views of the dashboard. These pages can be used to display content specific to the detected malicious server and hacker groups that performed attach on the Active Probing machine. For example, the pages can present information regarding the Command and Control center from where the attack originated, the Malware that was used, and the Hackers that performed the attack.

In the example presented in FIGS. 9-11, a user interface 116 of an Active Intelligence System 100 is shown that comprises expandable or selectable tabs to access pages or views that display information such as details regarding the detected malicious server, used by a particular hacker group, on a particular infected probing machine. Partial view of the identities and details of other infected machines on the network can be grayed out and displayed on one side of a screen, e.g., the left side of the screen. A dark gray bar can be used to separate network display (e.g., information regarding the machines on the network) from details pertaining to a specific infected machine on the network. This dark gray bar can comprise a tab with an arrow pointed towards the right side of the screen, and this tab can be used to enter a full screen view of the infected machines on the network.

FIGS. 9-11 depict screen captures of exemplary pages or views for a selected infected machine and a detected malicious server. In this case, the selected infected machine is referred to as HOWARD-PC, and the detected malicious server is identified by the IP, location, and protocol. In these examples, the identities and details for infected machines on the network are depicted vertically in a shortened greyed screen on the left hand side of the screen. Detailed content regarding the infected machine, in this case HOWARD-PC, and details regarding the attack and the malicious server probed by the system are displayed on the middle and right hand side of the screen. In this example, a user can learn more about the malicious server and hackers by selecting one of three tabs in the upper right hand corner of the screen to access different pages or views of the dashboard (e.g., C&C, Malware, and Hacker Group).

FIG. 9 is a screen capture of an Event Notification and Control and Command page viewed via a user interface 116 of an Active Intelligence System 100 of an exemplary embodiment. In FIG. 9, the Command and Control (C&C) tab or page has been selected and the user interface 116 provides details regarding the Command and Control center of the attackers/malicious online server. The C&C tab can be identified using the C&C IP address, the C&C Location, the C&C Host and the C&C protocol. Displayed above this information is a map, with a pin showing the location of the C&C; in this example the location is Germany. The host page of the C&C, the IP address, the C&C Protocol, as well as the Malware Network Communication are also displayed.

FIG. 10 is a screen capture of an Event Notification and Malware Detail page viewed via a user interface 116 of an Active Intelligence System 100 of an exemplary embodiment. In FIG. 10, the user or system administrator has selected the Malware tab. The greyed out network display listing and the details specific to HOWARD-PC remain visible on the left side of the screen; however, the right side of the screen now displays details regarding the Malware. In this instance, the full name of the Malware is identified (e.g., Ransom:Win32/TorrentLocker) and the geographic country of origin of the malware, the alias, and the affected platforms are listed. Below the affected platform on the Malware page display are another three tabs for displaying the description, the virulence, and the safety protocols or approaches. In this instance, the description is displayed, providing the user or system administrator with a detailed explanation of the type of attack that has occurred and the potential impact of the attack. This information can allow the user or system administrator to decide on additional courses of action, to raise awareness of organization or individual specific targets or attack, and/or to better inform users so they can anticipate any potential or resulting risks they may encounter later on as a result of the attack.

FIG. 11 is a screen capture of an Event Notification and Hacker Group Detail page viewed via a user interface 116 of an Active Intelligence System 100 of an exemplary embodiment. In FIG. 11, the user or system administrator has selected the Hacker Group tab. As in FIG. 9 and FIG. 10, the greyed out network display listing the details specific to selected infected computer, HOWARD-PC, remain displayed on the left side of the screen; however, the right side of the screen has changed to display details regarding the Hacker Group identified by the Active Intelligence System 100. In this case, the name of the hacker group (e.g., Russia) and the location of the Hacker Group (e.g., Russia) are presented. Also listed is the expertise, which in this case indicates that the Hacker Group has expertise in identity theft, spam, phishing. Additional information includes the Common Targets of the group (e.g., enterprise, financial institutions, oil & gas companies), the Location of the Hacker Group (e.g., Russia), Aliases (e.g., Russian Business Network, RBN), and a description of the attacker group with various information including, for example, details regarding the group's history.

In addition to the pages outlined, depicted and described in the examples above, a user interface 116 for presenting information from, or interacting with, the Active Intelligence System 100 can further comprise buttons or icons for accessing the identity and access management system and/or profile of the user or system administrator, as well as icons or buttons for closing screens, flipping between screens and refreshing the screens, logs or databases listing the detected malicious online servers and details about the identified malicious servers.

Computer Control Systems

Figure 12:
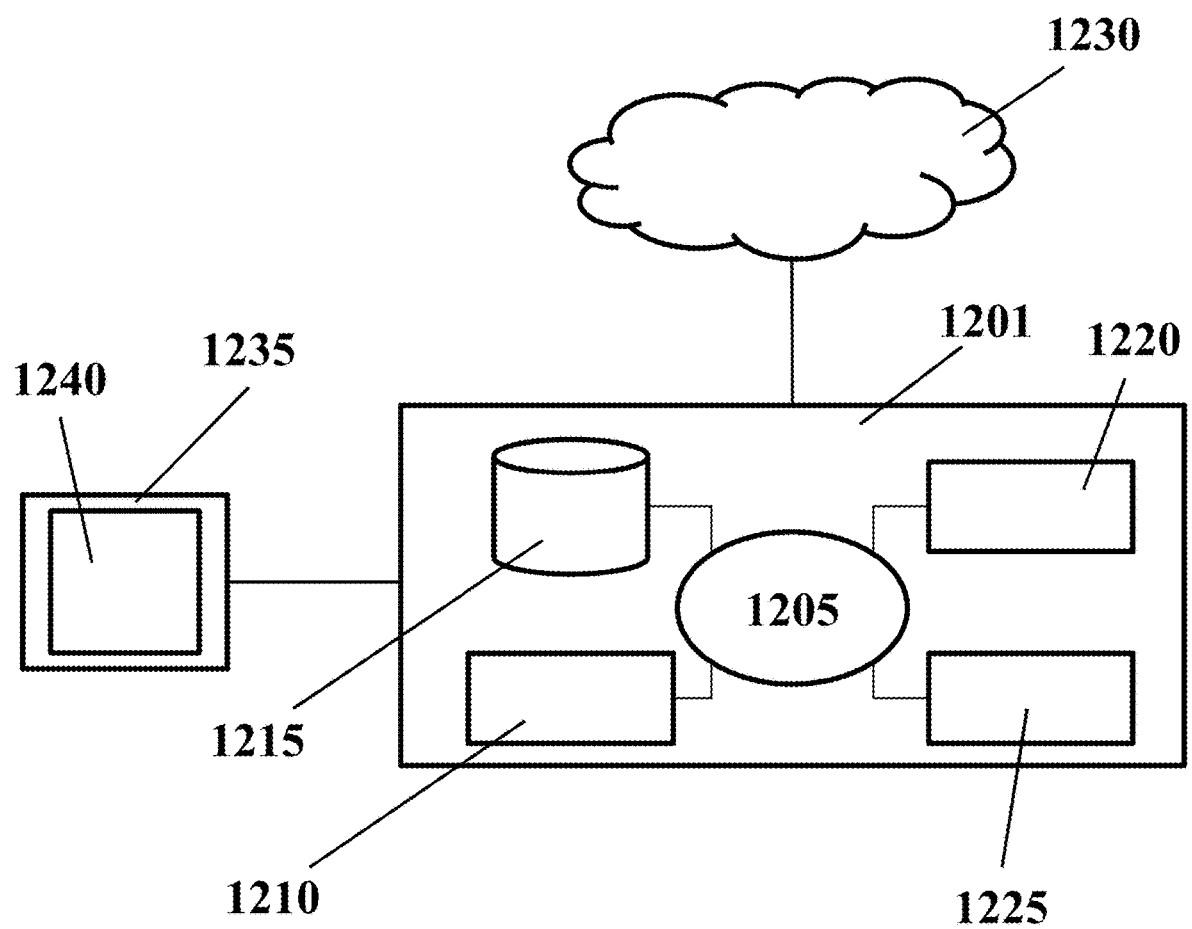
FIG. 12 shows a computer control system that is programmed or otherwise configured to implement methods provided herein.

The present disclosure provides computer control systems that are programmed to implement methods of the disclosure. FIG. 12 shows a computer system 1201 that is programmed or otherwise configured to detect one or more malicious online servers. The computer system 1201 can identify various types of malicious online servers and identify them as shown in the present disclosure by performing Active Probing and analyzing intelligence. The computer system 1201 can be implemented using one or more servers or using any computing devices that are configured to perform the various processes such as Active Probing and intelligence analysis process.

The computer system 1201 includes a central processing unit (CPU, also "processor" and "computer processor" herein) 1205, which can be a single core or multi core processor, or a plurality of processors for parallel processing. The computer system 1201 also includes memory or memory location 1210 (e.g., random-access memory, read-only memory, flash memory), electronic storage unit 1215 (e.g., hard disk), communication interface 1220 (e.g., network adapter) for communicating with one or more other systems, and peripheral devices 1225, such as cache, other memory, data storage and/or electronic display adapters. The memory 1210, storage unit 1215, interface 1220 and peripheral devices 1225 are in communication with the CPU 1205 through a communication bus (solid lines), such as a motherboard. The storage unit 1215 can be a data storage unit (or data repository) for storing data. For example, the data storage can be used to store database such as the VPN/Proxy IP database. The computer system 1201 can be operatively coupled to a computer network ("network") 1230 with the aid of the communication interface 1220. The network 1230 can be the Internet, an Internet and/or extranet, or an intranet and/or extranet that is in communication with the Internet. The network 1230 in some cases may be a telecommunication and/or data network. The network 1230 can include one or more computer servers, which can enable distributed computing, such as cloud computing. The network 1230, in some cases with the aid of the computer system 1201, can implement a peer-to-peer network, which can enable devices coupled to the computer system 1201 to behave as a client or a server.

The CPU 1205 can execute a sequence of machine-readable instructions, which can be embodied in a program or software. The instructions can be stored in a memory location, such as the memory 1210. The instructions can be directed to the CPU 1205, which can subsequently program or otherwise configure the CPU 1205 to implement methods of the present disclosure. Examples of operations performed by the CPU 1205 can include fetch, decode, execute, and writeback.

The CPU 1205 can be part of a circuit, such as an integrated circuit. One or more other components of the system 1201 can be included in the circuit. In some cases, the circuit is an application specific integrated circuit (ASIC).

The storage unit 1215 can store files, such as drivers, libraries and saved programs. The storage unit 1215 can store user data, e.g., user preferences and user programs. The computer system 1201 in some cases can include one or more additional data storage units that are external to the computer system 1201, located for example on a remote server that is in communication with the computer system 1201 through an intranet or the Internet.

Methods as described herein can be implemented by way of machine (e.g., computer processor) executable code stored on an electronic storage location of the computer system 1201, such as, for example, on the memory 1210 or electronic storage unit 1215. The machine executable or machine readable code can be provided in the form of software. During use, the code can be executed by the processor 1205. In some cases, the code can be retrieved from the storage unit 1215 and stored on the memory 1210 for ready access by the processor 1205. In some situations, the electronic storage unit 1215 can be precluded, and machine-executable instructions stored on memory 1210.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1201, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming.

All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s)

or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1201 can include or be in communication with an electronic display 1235 that comprises a user interface (UI) 1240 for providing, for example, the interfaces depicted in FIG. 9, FIG. 10, and FIG. 11. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1205. The algorithm can, for example, perform binary classification of intelligence to determine if the investigated server is malicious or benign, and other analysis and processes as described herein.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented system comprising: a digital processing device comprising: at least one hardware processor, an operating system configured to perform executable instructions, a memory, and a computer program including instructions executable by the digital processing device to create an application for detecting an online malicious server using a machine-learning active intelligence manager, the application comprising:

(a) a software module monitoring and capturing network traffic between one or more clients and one or more Internet servers, the network traffic comprising one or more Internet communications between at least one client and at least one server;

(b) a software module selecting an Internet communication between a client and a server;

(c) a software module extracting a network flow from the Internet communication, wherein the network flow consists of one or more variables related to the Internet communication between the client and the server;

(d) a software module constructing a session identity structure from the network flow; and (e) a software module comprising an automated machine-learning active intelligence manager that receives the session identity structure and classifies the server as malicious or benign based on the session identity structure, by (i) processing the session identity structure, (ii) collecting one or more types of forensic intelligence related to the operation of the server based on the processed session identity structure, wherein the one or more types of forensic intelligence comprise one or more members selected from the group consisting of: evasion based intelligence, geo location based intelligence, content based intelligence, and hosting infrastructure based intelligence (iii) combining the collected one or more types of forensic intelligence, (iv) extracting features from the combined forensic intelligence, and (v) classifying the server as malicious or benign based on the extracted features.

2. The system of claim 1, wherein the application further comprises a software module comprising a graphical interface for displaying information regarding the server, the information comprising information corresponding to one or more of the software modules in (a), (b), (c), (d), or (e).

3. The system of claim 1, wherein the session identity structure comprises (a) one or more characteristics of the server selected from the group consisting of: protocol, IP, domain, and port, or (b) data comprising one or more variables of the network flow.

4. The system of claim 1, wherein the one or more types of forensic intelligence comprise two or more members selected from the group consisting of: evasion based intelligence, geo location based intelligence, content based intelligence, and hosting infrastructure based intelligence.

5. The system of claim 1, wherein the extracted features comprise one or more members selected from the group consisting of: binary features, nominal features, and numeric features.

6. A computer-implemented method for detecting an online malicious server using a machine-learning active intelligence manager, comprising:

(a) monitoring and capturing, by a computer, network traffic between one or more clients and one or more Internet servers, the network traffic comprising one or more Internet communications between at least one client and at least one server;

(b) selecting, by the computer, an Internet communication between a client and a server;

(c) extracting, by the computer, a network flow from the Internet communication, wherein the network flow consists of one or more variables related to the Internet communication between the client and the server;

(d) constructing, by the computer, a session identity structure from the network flow; and (e) providing an automated machine-learning active intelligence manager that receives, by the computer, the session identity structure, and classifies, by the computer, the server as malicious or benign based on the session identity structure, by (i) processing the session identity structure, (ii) collecting one or more types of forensic intelligence related to the operation of the server based on the processed session identity structure, wherein the one or more types of forensic intelligence comprise one or more members selected from the group consisting of: evasion based intelligence, geo location based intelligence, content based intelligence, and hosting infrastructure based intelligence (iii) combining the collected one or more types of forensic intelligence, (iv) extracting features from the combined forensic intelligence, and (v) classifying the server as malicious or benign based on the extracted features.

7. The method of claim 6, further comprising displaying, using a graphical interface, information regarding the server, the information corresponding to one or more of (a), (b), (c), (d), and (e).

8. The method of claim 6, wherein the session identity structure comprises (a) one or more characteristics of the server selected from the group consisting of: protocol, IP, domain, and port, or (b) data comprising one or more variables of the network flow.

9. The method of claim 6, wherein the one or more types of forensic intelligence comprise two or more members selected from the group consisting of: evasion based intelligence, geo location based intelligence, content based intelligence, and hosting infrastructure based intelligence.

10. The method of claim 6, wherein the extracted features comprise one or more members selected from the group consisting of: binary features, nominal features, and numeric features.

11. A computer-implemented method for detecting an online malicious server, comprising:
(a) monitoring and capturing, by a computer, network traffic between one or more clients and one or more Internet servers, the network traffic comprising one or more Internet communications between at least one client and at least one server, wherein the monitoring and capturing are performed covertly with respect to the server;
(b) selecting, by the computer, an Internet communication between a client and a server;
(c) extracting, by the computer, a network flow from the Internet communication, wherein the network flow consists of one or more variables related to the Internet communication between the client and the server;
(d) constructing, by the computer, a session identity structure from the network flow; and
(e) classifying, by the computer, the server as malicious or benign based on the session identity structure, by (i) processing the session identity structure, (ii) collecting one or more types of forensic intelligence related to the operation of the server based on the processed session identity structure, wherein the one or more types of forensic intelligence comprise one or more members selected from the group consisting of: evasion based intelligence, geo location based intelligence, content based intelligence, and hosting infrastructure based intelligence (iii) combining the collected one or more types of forensic intelligence, (iv) extracting features from the combined forensic intelligence, and (v) classifying the server as malicious or benign based on the extracted features.

12. The method of claim 11, further comprising displaying, using a graphical interface, information regarding the server, the information corresponding to one or more of (a), (b), (c), (d), and (e).

13. The method of claim 11, wherein the session identity structure comprises (a) one or more characteristics of the server selected from the group consisting of: protocol, IP, domain, and port, or (b) data comprising one or more variables of the network flow.

14. The method of claim 11, wherein the extracted features comprise one or more members selected from the group consisting of: binary features, nominal features, and numeric features.

* * * * *